United States Patent
Trinks et al.

(10) Patent No.: US 11,613,489 B2
(45) Date of Patent: Mar. 28, 2023

(54) GLASS TUBE ELEMENT WITH IMPROVED QUALITY

(71) Applicant: SCHOTT AG, Mainz (DE)

(72) Inventors: Volker Trinks, Mitterteich (DE); André Witzmann, Waldershof (DE)

(73) Assignee: SCHOTT AG, Mainz (DE)

( * ) Notice: Subject to any disclaimer, the term of this patent is extended or adjusted under 35 U.S.C. 154(b) by 167 days.

(21) Appl. No.: 17/221,566

(22) Filed: Apr. 2, 2021

(65) Prior Publication Data

US 2021/0309556 A1     Oct. 7, 2021

(30) Foreign Application Priority Data

Apr. 3, 2020    (EP) .................................... 20168089

(51) Int. Cl.
| | |
|---|---|
| *C03B 17/04* | (2006.01) |
| *C03C 3/083* | (2006.01) |
| *C03C 3/085* | (2006.01) |
| *C03C 3/087* | (2006.01) |
| *C03C 3/089* | (2006.01) |
| *C03C 3/091* | (2006.01) |
| *C03C 3/093* | (2006.01) |
| *C03C 3/095* | (2006.01) |
| *C03C 3/097* | (2006.01) |
| *C03C 21/00* | (2006.01) |

(52) U.S. Cl.
CPC .............. *C03B 17/04* (2013.01); *C03C 3/083* (2013.01); *C03C 3/085* (2013.01); *C03C 3/087* (2013.01); *C03C 3/089* (2013.01); *C03C 3/091* (2013.01); *C03C 3/093* (2013.01); *C03C 3/095* (2013.01); *C03C 3/097* (2013.01); *C03C 21/002* (2013.01)

(58) Field of Classification Search
CPC ......... C03B 17/04; C03C 3/097; C03C 3/093; C03C 3/091; C03C 3/089; C03C 3/087; C03C 3/085; C03C 3/083
See application file for complete search history.

(56) References Cited

FOREIGN PATENT DOCUMENTS

JP      2010001166     1/2010

OTHER PUBLICATIONS

ASTM 0770-16, "Standard Test Method for Measurement of Glass Stress-Optical Coefficient", Oct. 15, 2018, 9 pages.
ISO 695: "Glass—Resistance to attack by a boiling aqueous solution of mixed alkali—Method of test and classification", Third Edition, May 15, 1991, 8 pages.
DIN ISO 7991:1987.

*Primary Examiner* — Ellen S Hock
(74) *Attorney, Agent, or Firm* — Ruggiero McAllister & McMahon LLC

(57) ABSTRACT

A glass tube element is provided that includes hollow cylindrical section that has a shell enclosing a lumen and a path extending on a surface of the shell facing away from the lumen. The path extends across a first area of the shell where the stress values are within a first interval. The path also extends across a second area of the shell where the stress values are within a second interval.

22 Claims, 5 Drawing Sheets

GLASS TUBE ELEMENT WITH IMPROVED QUALITY

CROSS REFERENCE TO RELATED APPLICATIONS

This application claims benefit under 35 USC § 119 of European Application 20168089.9 filed Apr. 3, 2020, the entire contents of which are incorporated herein by reference.

BACKGROUND

1. Field of the Invention

The present invention relates to a glass tube element.

2. Description of Related Art

Glass tube elements are widely used as basic parts in many different industries. One reason for that is that glass tube elements have the advantage that they can at least in part be reshaped in a subsequent processing chain easily and with convenient means in many different ways. A plurality of different products can be produced from just a few different glass tube elements as basic parts. This allows a flexible and wide product range at manageable costs and with widely available technical means.

Especially in the field of pharmaceutical containers glass tube elements are of particular interest as basic parts for vials, syringes or the like. Furthermore, glass can be made such that it is free of toxic ingredients like Pb, As, and Cd, has high chemical stability and also high chemical inertness. Because of the high chemical stability of the glass the precipitation or leaking out of substances of the glass wall (or shell) of the glass tube element can be eliminated or at least reduced, which particularly indicates great suitability for the pharmaceutical domain.

Along with the high degree of freedom concerning design options, it is apparent that glass tube elements come along with advantageous properties for being used as basic parts for pharmaceutical containers in combination with pharmaceutical compositions.

However, the demands placed on pharmaceutical containers are high. And so are the demands placed on glass tube elements. For fulfilling respective specifications, it is especially required that also the respective basic parts have a uniform design, hence, geometric parameters within strict boundaries. This way it can be ensured that a product such as a syringe made on basis of a glass tube element is free of unintended tensions per se and has no mismatches with respect to other parts such as caps or the like to which it should be connected later. This allows a safe interaction of the product with other parts and a safe handling of the product in general.

Otherwise, critical situations either in the production process or during use may arise. A destruction of the product, e.g., a pharmaceutical container, might happen. Thus, the loss of the pharmaceutical composition held by the container and, in addition, risks for persons handling with the pharmaceutical container might be the result.

Therefore, quality requirements placed on pharmaceutical container are likewise also placed on the basic parts in form of glass tube elements. So far, there have been identified a large variety of geometric parameters of the glass tube elements which can be made subject to optimization in order to achieve glass tube elements of high quality.

However, the demands on the quality are continuously increasing. It is, therefore, necessary to improve further the quality of the pharmaceutical containers, hence, the quality of the glass tube elements.

It is, thus, the object of the present invention to provide glass tube elements of improved quality, which are particularly suitable for use as basic parts for further processing such as reshaping according to the needs in the pharmaceutical industry. It is also an object of the present invention to provide a use for such a glass tube element and a method for producing such a glass tube element.

SUMMARY

The problem is solved by the invention according to a first aspect in that a glass tube element comprising at least one section which is of hollow cylindrical form, wherein the section has at least one shell which encloses at least one lumen; wherein at least one path extending on the surface of the shell facing away from the lumen can be defined; wherein the path extends across at least one first area of the shell, where the stress values are within a first interval, and at least one second area of the shell, where the stress values are within a second interval is proposed.

The invention is, thus, based on the surprising finding that glass tube elements have improved quality and, thus, are particular suitable for subsequent processing such as at least partly reshaping if the stress pattern on and/or beneath the surface is designed such that there are different areas of stress present. Such a design option has been found to indicate a glass tube element of particular high quality, especially for a symmetric arrangement of the different areas.

The inventors found that for increased symmetry of the distribution of the first and second areas the strength of the glass product is increased. It is astonishing that an increased symmetry in turn results in improved quality of the glass tube element. As one result the inventors found that improved quality comes along with improved geometric parameters such as the straightness of the glass tube element. It is evident that an improved straightness enables an improved usability for subsequent manufacturing steps as well as improved usability of the glass tube elements in combination with other elements. This is because for example the interconnectability is improved. Improved stress patterns also allow to divide the glass tube elements in sub-elements in a more reliable and safe manner.

The inventive concept allows a surprisingly reliable and cheap way to obtain a glass tube element of high quality, hence, high quality products based on such glass tube elements.

In preferred embodiments the stress is mechanical stress. It is acknowledged that the terms "shell (of the cylinder/glass tube element)" and "wall (of the cylinder/glass tube element)" are used as synonyms here.

It is acknowledged that the terms "outer surface (of the shell)" and "surface (of the shell) facing away from the lumen" are used as synonyms here.

It is acknowledged that preferably each "stress value" here might refer to a difference value, $\Delta\sigma$, which is the difference between an axial stress value, $\sigma_{axial}$, and a radial stress value, $\sigma_{radial}$. Axially and radially is then defined with reference to the center axis of the glass tube element.

Indeed, often the radial stress value is relatively small compared to the axial stress value and can, hence, be neglected from a practical point of view. Moreover, the axial stress is often the relevant one for assessing the quality of the glass pipe element, e.g., with respect to the breaking strength.

It is acknowledged that the person skilled in the art knows how to measure the stress values of different surface areas. For example, measuring the stress values of a surface area might comprises optical measurements. In this regard the respective surface area is scanned or rasterized sequentially at different points by means of a light ray (such as a laser beam) being tangent to the respective surface points and the optical delay of the light ray is measured. Each optical delay in turn can be transformed into a stress value, for example by means of the Wertheim law.

The person skilled in the art knows that it is possible to transform values of the optical delay into corresponding values of the mechanical stress. Especially the "Wertheim law" might be employed to accomplish this task, i.e., $\partial = C \times \Delta\sigma \times d$. Here $\partial$ is the optical delay, C is the stress optical constant, $\Delta\sigma$ is the stress difference between stress along (i.e., axial direction) and perpendicular (i.e., radial direction) to the center axis of the glass tube element, d is the thickness of the specimen which the light ray crosses during the optical measurements.

This means that the stress optical constant is defined as a material property of the respective glass material. The stress optical constant might be determined by a measurement of the optical delay for a specimen having defined stress parameters.

Preferably the stress optical constant has a value of between 2.2 and 4 $TPa^{-1}$.

In preferred embodiments the stress optical constant might alternatively or in addition be measured according to Procedure C (Glass Disc Method) described in ASTM standard C770-1 6, entitled "Standard Test Method for Measurement of Glass Stress-Optical Coefficient" the contents of which are incorporated herein by reference in their entirety.

Hence, by scanning/rasterizing the surface area of interest at many points and subsequent applying of the Wertheim law, the stress values of that surface area might be obtained.

For example, for the optical measurements, the light ray has a linear polarization which encloses an angle of 45 degrees with the center axis of the glass tube element. For example, the light ray has light of wavelength 630 nm, 633 nm or 635 nm. For example the ambient temperature is room temperature.

BRIEF DESCRIPTION OF THE FIGURES

Various aspects of this invention will become apparent to those skilled in the art from the following detailed description of preferred embodiments, when read in light of the accompanying schematic drawings, wherein.

DETAILED DESCRIPTION

Figure 1:
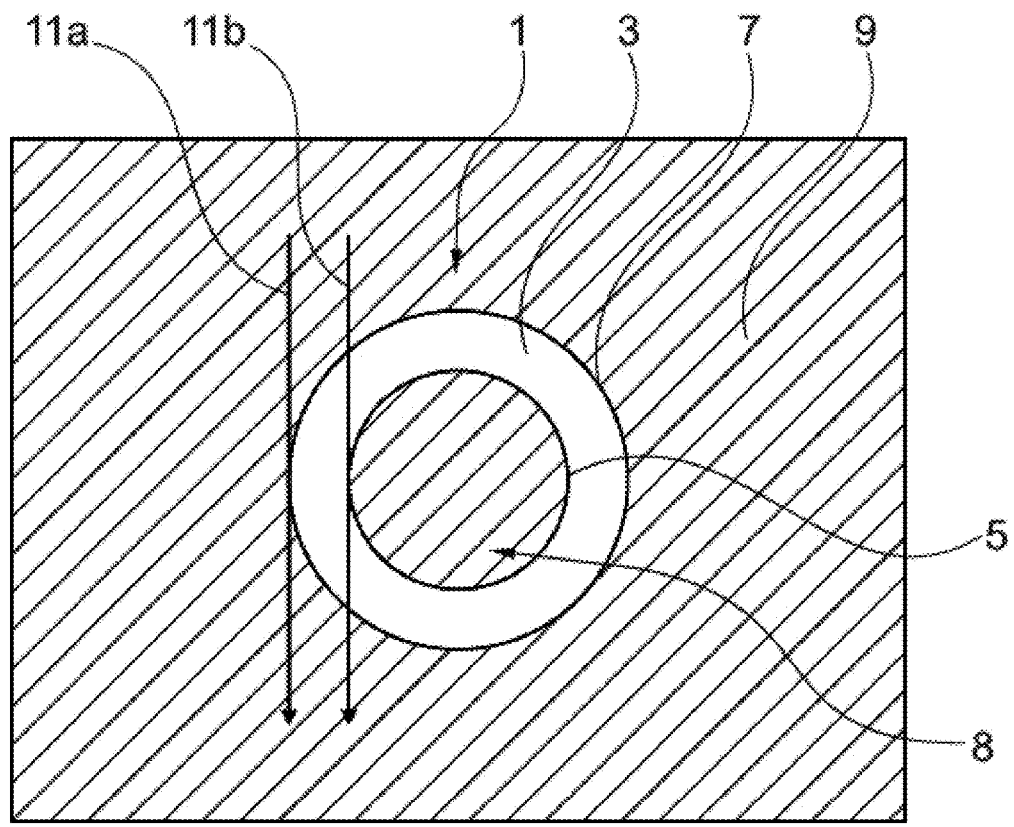
FIG. 1 shows an illustration of a cross-sectional plane of a glass tube element according to the invention.

The optical measurements are described in further detail also below with respect to FIG. 1 and reference can be made to that part of the application to avoid unnecessary repetition here.

In one embodiment it might alternatively or in addition be preferred that the path follows, preferably across the entire length of the glass tube element or the section thereof, at least one of the intersection lines which can be obtained by the intersection of a plane comprising the entire center axis of the glass tube element and the surface of the shell facing away from the lumen.

If the path extends parallel to the center axis of the glass tube element the arrangement of the different areas in a longitudinal direction can be defined which might be particularly useful in case a variation of the stress pattern is mainly or inter alia present in that direction.

In one embodiment it might alternatively or in addition be preferred that the path follows, preferably across the entire outer circumference of the glass tube element or at least one section thereof, at least one of the intersection lines which can be obtained by the intersection of a plane perpendicular to the center axis of the glass tube element and the surface of the shell facing away from the lumen.

If the path extends perpendicular to the center axis of the glass tube element the arrangement of the different areas in a circumferential direction can be defined which might be particularly useful in case a variation of the stress pattern is mainly or inter alia present in that direction.

In one embodiment it might alternatively or in addition be preferred that in at least one direction along the path, the second area follows successively after the first area.

If the first and second area follows successively after each other it is particularly possible to obtain a uniform optical delay. Furthermore, this type of stress pattern can be realized in a particularly efficient, hence, cheap manner.

In one embodiment it might alternatively or in addition be preferred that the path extends across a first plurality of first areas and a second plurality of second areas, wherein preferably in at least one direction along the path first areas and second areas occur repeatedly alternately, preferably in direct succession, and wherein preferably the first plurality comprises the same number of areas as the second plurality.

If the stress pattern of the glass tube element comprises more than one first area and more than one second area, it is possible to achieve a highly regular stress pattern and, hence, a uniform distribution of optical delay. This in turn has positive effects on the quality of the actual glass tube element.

If the succession of the different types of areas (along the defined path) is directly, i.e., a first second area follows directly on a first first area, and the second first area follows directly the second first area which in turn is directly followed by the second second area, and so on, a particular regular pattern can be achieved. This has been proven to be very useful for obtaining a high quality glass tube element.

The regularity can be improved even more if the same number of first and second areas is used.

In preferred embodiments the first plurality has a number of 2, 3, 5, 10, 15, 20, 25, 30 or 50. In preferred embodiments the second plurality has a number of 2, 3, 5, 10, 15, 20, 25, 30 or 50. In preferred embodiments, both, the first and the second plurality each has a number of 2, 3, 5, 10, 15, 20, 25, 30 or 50.

In one embodiment it might alternatively or in addition be preferred that in at least one direction along the path, the path extends across the at least one first area and at least one third area of the shell, where the stress values are within a third interval, wherein preferably in that direction along the path the third area (i) follows successively after the first area and/or (ii) is arranged, preferably directly, between the first area and the next first or second area located downwards the path.

It has been proven to be particularly useful to incorporate a third area with at least partly different stress values than that for the first and second areas. It is astonishing that although the third area interrupts the preferred regular pattern of first, second and/or third areas, it nevertheless lead to an improved quality.

If the third area is "sandwiched" (i.e., successors along the defined path) between the first area and the second area or between two first areas a particular high quality glass tube element is obtained. Of course, it may be preferred that the areas are direct successors.

In one embodiment it might alternatively or in addition be preferred that in at least one direction along the path, within at least one second area, preferably within all second areas, the path extends across a number of successive sub-areas of the second area, where the stress values of each sub-area are within a respective sub-interval comprised by the second interval, wherein preferably the value ranges of the individual sub-intervals are at least partly different, at least partly the same, at least partly overlapping and/or at least partly non-overlapping.

If the second area is split up in a plurality of sub-areas, the stress pattern can be controlled on a more granular basis. This is particularly useful for obtaining high quality glass tube elements for which it has turned out that a high depth of control of the stress pattern is beneficial.

In preferred embodiments at least one or each second area has 2, 3, 4, 5, or more than 5 sub-areas.

In one embodiment it might alternatively or in addition be preferred that the different areas are arranged along the path such that diametrically opposed to at least one first area, preferably to each first area, at least one of the second and/or third areas is arranged; and/or wherein preferably the value range of the first interval is different to and/or non-overlapping with the value range of the second interval.

The intervals of the areas are often non-overlapping because in preferred embodiments there can be provided areas of high values and area of low values in an alternating manner.

In one embodiment it might alternatively or in addition be preferred that the values of the first interval correspond to compressive stress and the upper border of the second interval has an absolute value larger than the greatest absolute value of the first interval and/or wherein the first interval comprises the value range between −0.5 MPa and −10 MPa, preferably between −1 MPa and −8 MPa, more preferably between −1 and −5 MPa, between −4 MPa and −6 MPa and/or between −3 MPa and −8 MPa, and/or the second interval corresponds to an offset relative to the first interval of up to −5 MPa, preferably of between −0.5 MPa and −3 MPa, more preferably of between −1 and −2.5 MPa.

In preferred embodiments the first and second interval is continuous. This allows to provide a particularly useful design specification.

For example the first interval might comprises the value range between −0.5 MPa and −10 MPa and the second interval corresponds to an offset relative to the first interval of up to −3 MPa. This preferably means that if the first interval is between −0.5 MPa and −10 MPa, then, the second interval is between −10 MPa and −13 MPa.

In one embodiment alternatively or in addition the first interval might comprise the value range between −0.5 MPa and −2 MPa, between −0.5 and −3 MPa, between −0.5 and −4 MPa, between −0.5 and −5 MPa, and/or between −0.5 and −6 MPa.

In one embodiment alternatively or in addition the second interval might corresponds to an offset relative to the first interval of up to −1 MPa, of up to −1.5 MPa, of up to −2 MPa, and/or of up to −2.5 MPa.

In one embodiment it might alternatively or in addition be preferred that the sections of the path lying within the first areas and/or second areas, especially within the sub-areas of the second areas, each have an identical length.

If the sections of the path lying within the first areas each has an identical length, the stress pattern can be realized in a particularly regular, hence, preferred manner with respect to the quality of the glass tube element. This is true because in this case each first area has the same length along the direction of the path (e.g., axial or circumferential).

If the sections of the path lying within the second areas each has an identical length, the stress pattern can be realized in a particularly regular, hence, preferred manner with respect to the quality of the glass tube element. This is true because in this case each second area has the same length along the direction of the path (e.g., axial or circumferential).

If the sections of the path lying within the first and second areas each has an identical length, the stress pattern is even more regular, hence, preferred manner with respect to the quality of the glass tube element. This is true because in this case all of the first and second areas have the same length along the direction of the path (e.g., axial or circumferential).

In one embodiment it might alternatively or in addition be preferred that the sections of the path lying within the sub-areas of at least one second area, especially within the sub-areas of all second areas, each have a length specifically defined for all sub-areas having a respective sub-range.

If the path has the same length in each sub-area which has the same value range, an improved regularity, hence, improved uniformity of the optical delay, hence improved quality of the glass tube element can be obtained. Either only the sub-areas of one second area are taken into account or the sub-areas of even all second areas, which even more increases the uniformity.

For example, all second areas have a first sub-area, a second sub-area and a third sub-area. The first and third sub-area have the same value range which is different from the value range of the second sub-area. In this case it is preferred that the path in all first sub-areas and all second sub-areas (i.e., of all second areas) has the same length. In the second sub-areas the path may have a different length. However, it is not excluded that for the second sub-areas the same length is defined as for the first and third sub-areas.

In one embodiment it might alternatively or in addition be preferred that the first area, the second area, preferably the sub-areas, and/or the third area each comprise (i) at least one surface area of the surface of the shell facing away from the lumen and/or (ii) at least one volume area of the shell, wherein the shell preferably has a thickness measured from the surface of the shell facing away from the lumen in perpendicular direction towards the lumen.

It is acknowledged that the first and second areas can be either surface areas (i.e., two-dimensional areas) or volume areas (i.e., three-dimensional areas) as outlined elsewhere in more detail. In the latter case it is preferred that the thickness is the same everywhere in the respective first and/or second area.

It is acknowledged that in every case the first and second area comprises at least one part of the outer surface of the shell, hence of the glass tube element. This is because the thickness of the volume area is measured from the outer surface of the shell. The outer surface of the shell is synonymous used for the surface of the shell facing away from the lumen.

In one embodiment it is alternatively or in addition preferred that the first area of the shell comprises at least one first surface area of the shell. In one embodiment it is alternatively or in addition preferred that the second area of the shell comprises at least one second surface area of the shell.

In one embodiment it might alternatively or in addition be preferred that, especially for a plurality of parallel running paths of the defined kind, first groups of first areas can be defined, wherein the first areas of each of the first groups are connected with each other by means of a connected first super-area of the shell, second groups of second areas can be defined, wherein the second areas of each of the second groups are connected with each other by means of a connected second super-area of the shell, especially sub-groups of sub-areas of the second areas can be defined, wherein the sub-areas of each of the sub-groups are connected with each other by means of a connected super-sub-area of the shell, and/or third groups of third areas can be defined, wherein the third areas of each of the third groups are connected with each other by means of a connected third super-area of the shell, wherein preferably the values of the stress within the first super-area lie within the first interval, the values of the stress within the second super-area lie within the second interval, especially the values of the stress within the super-sub-area lie within the sub-interval corresponding to the respective sub-area, and/or the values of the stress within the third super-area lie within the third interval.

It is the astonish finding that although it is sufficient from the perspective of a single path that first areas, second areas and third areas respectively are present only locally at the location of the path (and maybe in the vicinity thereof). This, however, must be by far neither necessary nor usual.

Indeed, the one or more first, the one or more second and/or the one or more third super-areas each can be large areas, each covering large parts of the shell. Actually, there can be two or more first super-areas and/or two or more second super-areas and/or two or more third super-areas.

For example there might be two or more super-areas. Each of the two or more first super-areas can be identical with respect to design, stress values and the like. However, they can still be separated from each other. This is possible because the individual first areas are grouped in an appropriate manner so that they are all connected by the respective first super-areas which actual are present in the shell, especially in the outer surface thereof. Preferably in the first super-areas the stress values are within the first interval and outside the first super-areas there can be other stress values. This criterion is essential for grouping the first areas appropriately.

In other words: Two independent first areas cannot be grouped within the same group if they cannot be connected by a common super-area. This might be the case if the common super-area would have to cross an area of the shell where the stress values lie outside of the respective interval corresponding to the super-area. The same apply mutatis mutandis to the second super-areas and the third super-areas.

It is acknowledged that all of the parallel running paths are identical defined and all aspects defined with respect to one path apply accordingly to the others.

In one embodiment it might alternatively or in addition be preferred that on the unrolled cylinder shell the first super-area, the second super-area, especially the super-sub areas, and/or the third super-area, preferably the respective outer surface, i.e., previously faced away from the lumen, each is designed at least in part in form of at least one stripe, preferably in form of a plurality of parallel and/or non-parallel stripes.

Super-areas can be designed in form of stripes which allows to provide them on the glass tube element in an efficient manner.

In one embodiment it might alternatively or in addition be preferred that the number of first super-areas, the number of second super-areas, especially super-sub areas, and/or the number of third super-areas, respectively, of the shell each is between 1 and 100, preferably between 2 and 50, more preferably between 2 and 30 and most preferably between 5 and 20.

The more super-areas are used the denser the stress pattern can be applied to the glass tube element in an efficient manner. This is true because due to the curvature of the glass tube element's surface it might be more convenient to apply a plurality of smaller stripes in order to provide a high coverage of stress patterns rather than just applying one single broad stripe.

In one embodiment it might alternatively or in addition be preferred that when conducting optical measurements on the glass tube element, by means of at least one light ray which extends along a measurement path, which measurement path extends in a direction of measurement perpendicular to the direction of the main extension of the glass tube element and which measurement path is tangent to the surface of the shell facing away from the lumen and which measurement path touches the surface for different measurements at different positions each having a different azimuth angle within a cylindrical coordinate system fixedly attached to the glass tube element and having its origin on the center axis of the glass tube element, the optical delays of the light ray obtained from the different measurements have values which all fall within a range having a size of between 3 and 30 nm, wherein preferably (i) the light ray comprises a wavelength of between 250 and 900 nm, preferably between 390 and 800 nm, most preferably 394 nm or 633 nm; (ii) the glass tube element is surrounded by at least one fluid such that at least the surface of the shell facing away from the lumen is in contact with the fluid; (iii) the glass tube element is completely immersed in at least one fluid such that at least the surface of the shell facing away from the lumen and the surface of the shell facing towards the lumen, both, are in contact with the fluid; (iv) the fluid has, preferably for the wavelength of the light ray, an optical density which is at most 1% different compared to the optical density of the glass material of the glass tube element; (v) the fluid has, preferably for the wavelength of the light ray, an optical density of between 1.2 and 2.5, preferably between 1.3 and 1.7 and most preferably 1.362, 1.460, 1.463, 1.472, 1.473, 1.474, 1.486, between 1.492 and 1.493, 1.497, 1.501, 1.516, 1.525 or between 1.43 and 1.61; (vi) preferably the fluid comprises ethyl alcohol, olive oil, carbon tetrachloride, sunflower oil, terpentine, glycerine, furfuryl alcohol, dibutylphtalat 84-74-2, toluol, benzene, dimethyphtalate, monochlorobenzene or silicon oil or any combination thereof; (vii) the optical delays of the light ray obtained from the different measurements have values which all fall within a range of between 10 and 150 nm, preferably between 20 and 100 nm, and/or the optical delays of the light ray obtained from the different measurements have values which all fall within a range having a size of between 3 and 30 nm, preferably between 4 and 25 nm, more preferably between 5 and 20 nm; (viii) 360 measurements are carried out each having a different azimuth angle selected from the integer values between, and inclusive of, zero and 359 degrees; (ix) the different areas are arranged along the path such that the values of the optical delay are within said size of range; and/or (x) each measurement is carried out for positions having the same height and/or the same radius within the cylindrical coordinate system.

It is the astonishing finding that a particular preferred arrangement of the different areas of stress, hence a particular robust and preferred glass tube element, is obtained if the optical delay is uniform.

The inventors found that the optical delay is uniform if the variation is limited within a certain range. It is the astonishing finding that the lower border of the range is larger than zero and the upper border is located at about ten times the lower border.

If the glass tube element is completely immersed in water the measurements can be performed more stable.

If an appropriate fluid is chosen, especially a fluid which has for the wavelength used for the measurements an optical density which is close to the optical density of the glass material of the glass tube, more reliable measurement results can be obtained.

It is acknowledged that preferably certain values all fall within a range having a size of between X and Y, if the difference value between every two of the certain values is between (and inclusive of) X and Y. In other words, a common offset of the values of the measured optical delays is here not of interest.

However, in one embodiment alternatively or in addition the optical delay measured might have a value of between 10 nm and 150 nm for a shell of thickness 1 mm and where the thickness of the specimen which the light ray crosses during the optical measurements is also 1 mm.

It is acknowledged that even if the measurement path is tangent to the surface of the shell facing away from the lumen, the person skilled in the art understands that conducting optical measurements in reality always will include also one or more light rays which are shifted towards the center axis of the glass tube element and/or which have some spatial extension in a direction perpendicular to the direction of propagation, i.e., they propagate at least partly within the shell. For example a tangential light ray might preferably be up to 10 μm beneath the outer surface.

The arrangement of the areas in the suggested manner allows to define the variation of the optical delay in a precise manner.

The intervals of the areas are often non-overlapping because in preferred embodiments there can be provided areas of high values and area of low values in an alternating manner.

The person skilled in the art knows that it is possible to transform values of the optical delay into corresponding values of the mechanical stress. Especially the "Wertheim law" might be employed to accomplish this task, i.e., $\partial = C \times \Delta\sigma \times d$. Here $\partial$ is the optical delay, C is the stress optical constant, $\Delta\sigma$ is the stress difference between stress along (i.e., axial direction) and perpendicular (i.e., radial direction) to the center axis of the glass tube element, d is the thickness of the specimen which the light ray crosses during the optical measurements.

This means that the stress optical constant is defined as a material property of the respective glass material. The stress optical constant might be determined by a measurement of the optical delay for a specimen having defined stress parameters.

Preferably the stress optical constant has a value of between 2.2 and 4 $TPa^{-1}$.

In one embodiment it might alternatively or in addition be preferred that the glass tube element has a length of between 0.5 and 5 m, preferably of between 0.7 and 3 m, more preferably of between 1 and 2 m, even more preferably between 1.2 and 1.8 m and most preferably of 1.5 m.

A glass tube element which has a length in the preferred range has an improved quality. This is because a more stable and more defined glass tube element is obtained.

In one embodiment it might alternatively or in addition be preferred that the maximal outer diameter is between 1 and 100 mm, preferably between 3 and 60 mm, more preferably of between 6 and 45 mm, 8 and 19 mm, 6 and 50 mm or 8 and 30 mm.

A glass tube element which has a maximal outer diameter in the preferred range has an improved quality. This is because a more stable and more defined glass tube element is obtained.

In one embodiment it might alternatively or in addition be preferred that the shell has an average thickness of between 0.1 and 5 mm, preferably between 0.2 and 3 mm, more preferably of between 0.3 and 2.5 mm, most preferably between 0.4 and 1.8 mm.

A glass tube element which has a preferred average thickness of the shell is particularly suitable for applying the inventive approach because an even more reliable first and second ratio can be obtained for such glass tube elements.

The term "average thickness" means here the average thickness of the shell across the length of the glass tube element. If the thickness of the shell has everywhere a constant value, the average thickness is identical to the actual thickness.

In one embodiment it might alternatively or in addition be preferred that the glass tube element comprises at least in part silicate glass, such as soda lime and/or alumosilicate glass, and/or borosilicate glass.

In one embodiment it might alternatively or in addition be preferred that the glass tube element, especially its glass material, has a transition temperature which is higher than 300 degrees C., preferably higher than 500 degrees C., more preferably higher than 520 degrees C., even more preferably higher than 530 degrees C., even more preferably higher than 550 degrees C., and most preferably higher than 600 degrees C. and/or lower than 900 degrees C., preferably lower than 800 degrees C., more preferably lower than 700 degrees C., even more preferably lower than 650 degrees C., and most preferably lower than 630 degrees C.

Preferably the transition temperature refers to the transition temperature of the glass used for the wall of the glass tube element.

In one embodiment it might alternatively or in addition be preferred that the glass tube element, preferably during its production process, is at least temporarily connected to one or more further glass tube elements, preferably in one piece, and/or is part of at least one glass tube line.

It is more economic to manufacture a longer or even an endless glass tube line with subsequent confectioning of individual glass tube elements from that line with a desired length.

In one embodiment it might alternatively or in addition be preferred that the glass tube element has an average linear coefficient of thermal expansion measured in the range of 20 degrees C. to 300 degrees C. (CTE) between 3.0 and $10.0*10$ $K^{-1}$, preferably between 3.3 and $7.5*10^{-6}$ $K^{-1}$, more preferably between 4.7 and $6.0*10^{-6}$ $K^{-1}$.

It is beneficial for the glass tube to have a lower CTE, which leads to a more uniform product. Hence, in preferred embodiments, the CTE is limited to no more than $6.9*10^{-6}$ $K^{-1}$ or no more than $5.9*10^{-6}$ $K^{-1}$. The CTE may be measured according to DIN ISO 7991:1987.

In one embodiment it might alternatively or in addition be preferred that the glass tube element, preferably during its production process, at least during at least one part of its period of cooling passes with a defined speed of movement along a defined path of movement, preferably the path of movement extends parallel to the direction of the main extension of the glass tube element and/or in a horizontal direction, through at least one cooling device, for setting up a locally modified cooling rate of the glass tube element.

It has been surprisingly found that the geometric parameters, hence, each of the first and second ratio and the overall quality of the glass tube element can be improved, if the glass tube element undergoes a special treatment during its period of cooling. It has been proven to lead to advantageous results if the process of cooling is influenced by changing the cooling rate of the glass tube element locally.

Preferably the cooling rate of the outer surface of the glass tube element is modified. However also modifications to the cooling rate elsewhere such as within the shell of the glass tube element might be applied.

If the speed of movement and the path of movement is defined, a higher control of the cooling process can be obtained. Particularly a path of movement which is straight or at least nearly straight has been found as being preferred for a uniform and reproducible interaction.

The inventors assume that applying the mentioned treatment using the cooling device as well as the other settings, respectively, during the cooling process lead to a manipulation of the structure, especially the structure on, beneath and/or near the outer surface, of the glass tube element which in turn lead to improved geometric properties of the same.

In one embodiment it might alternatively or in addition be preferred that the speed of movement is between 1 and 1000 cm/s, preferably between 20 and 800 cm/s, more preferably between 30 and 500 cm/s and most preferably 100 cm/s.

For preferred speeds an optimal interaction time between the cooling device and the glass tube element is obtained. Hence, a glass tube element of improved quality is obtained as well.

In one embodiment it might alternatively or in addition be preferred that the glass tube element has at least temporarily a surface temperature of between Tg−50 and Tg+150 degrees C. while passing through and/or along the cooling device.

The inventors have found that a glass tube element which has a surface temperature (especially the temperature of the outer surface of the shell) which is within a certain interval around the transition temperature of the material (i.e., glass) of the glass tube element, a particular beneficial interaction between the cooling device and the glass tube element can be obtained. The result is a glass tube element of improved quality.

The inventors assume that for a temperature range around the transition temperature, the glass tube element can be affected by the inventive concept in an advantageous manner compared to other temperatures because the cooling device can so to say "imprint" a modification which lead to improved properties of the glass tube element.

In preferred embodiments the surface temperature is the temperature at the outer surface.

It is acknowledged that the glass tube element has a surface temperature within the preferred temperature interval at least temporarily while passing through/along the cooling device. In other words, it is required in the preferred embodiments that the surface temperature of the glass tube element is at least for some time within the preferred temperature interval while passing through/along the cooling device.

This does not exclude that the surface temperature is, e.g., at the beginning of passing through/along the cooling device, above the upper limit and/or that the surface temperature is, e.g., at the end of passing through/along the cooling device, below the lower limit.

In one embodiment it might alternatively or in addition be preferred that the cooling device has at least one contacting device, wherein the contacting device has at least from time to time and/or area by area, preferably direct, contact with at least one area of the outer surface of the glass tube element.

It is the astonish finding that providing a contacting device allows controlling the locally existing cooling rate on the surface, respectively of the outer surface, of the glass tube element in a precise, reliable and comfortable manner. It is also possible to control the instance of time when it contacts the glass tube element. This might be controlled for example by a respective spatial placement of the contacting device within the cooling device, such that the glass tube element passes at an earlier or later instant of time along the respective contacting device. Of course, preferably not the entire contacting device must be in contact with the glass tube element, but it may. Also a part thereof might be sufficient. Of course, not the entire outer surface of the glass tube element must have contact with the contacting device, but it may. Also an area of the outer surface of the glass tube element might be sufficient.

These design parameters allow to efficiently control the degree of interaction between the contacting device and the glass tube element. The earlier, the longer and the more widely the contact between the contacting device and the glass tube element is, the more interaction between both might take place, hence, the more cooling might take place.

In further preferred embodiments the cooling device has alternatively or in addition at least one fluid dispenser device which is designed to provide a fluid, such as water, fog and/or air, preferably compressed air, preferably at least from time to time and/or area by area, on at least one area of the outer surface of the glass tube element.

Using a fluid allows an improved control of the cooling process of the glass tube element. Especially a high change of the temperature within short time can be achieved that way. This might also be used for supporting the cooling process carried out by the contacting device.

Preferably the fluid dispenser is designed at least in part in form of at least one ring nozzle. This allows that a homogeneous (and circumferential) interaction between the fluid and the glass tube element is achieved. In other words, using ring nozzles allows to cover the complete outer surface of the glass tube element. It has been proven that this lead to an improved straightness of the glass tube element at least in sections.

In also preferred embodiments the fluid dispenser is used as part of at least one air bearing and/or in combination with at least one contacting device. This allows to obtain an interaction with reduced or even without directly contacting the glass tube element with the contacting device. This may reduce contamination effects.

In one embodiment it might alternatively or in addition be preferred that the cooling device has a plurality of contacting devices, wherein preferably a first number of the plurality of contacting devices comes in contact with the outer surface of the glass tube element one after another in time and/or at different areas of the outer surface and/or a second number of the plurality of contacting devices comes in contact with the outer surface of the glass tube element at the same time and/or at different areas of the outer surface.

Using more than one contacting device allows a more efficient interaction between the cooling device and the glass tube element and, thus, a further improvement of the properties of the glass tube element.

If some or all of the contacting devices sequentially (spatially and/or in time) come in contact with the outer surface of the glass tube element (wherein the contacting devices do not necessarily all have to contact the same areas of the outer surface of the glass tube element but at least some or all contacting devices may contact different areas of the outer surface of the glass tube element) a graded interaction might be obtained because for example the contact occurs at different temperatures of the outer surface and/or with different interaction devices.

If some or all of the contacting devices (which are for example spatially distributed) come in contact with the outer surface of the glass tube element (but e.g., at different areas thereof) at the same time the interaction between the contacting devices and the glass tube element can take place within a small physical volume, hence, the cooling device can be of only reduced size. This is beneficial from an economic point of view.

In one embodiment it might alternatively or in addition be preferred that two contacting devices, preferably each of two contacting devices, respectively of the plurality of contacting devices, which are arranged down along the path of movement in a consecutive manner have a center-center-distance, preferably measured along the path of movement, of 50 cm or less, more preferably of 40 cm or less, even more preferably of 30 cm or less, even more preferably of 20 cm or less, and most preferably of 10 cm or less.

It has proven advantageous to allow different distances between adjacent contacting devices down the path of movement. In addition the distances between adjacent contacting devices may vary. Preferably the distance is reduced. This may lead to an increased number of subsequent interactions during higher surface temperatures, which might have more impact on the properties of the glass tube element than interactions at lower surface temperatures. This also allows interaction with the glass tube element within a shorter period of time.

It has been proven to be advantageous to apply such an increased interaction, even if it comes on cost of a larger setup. The resulting glass tube elements have improved geometric parameters, especially improved first and second ratios, hence improved quality.

In preferred embodiments the center-center distance between adjacent contacting devices is small or even very small, especially compared to the length of the glass tube element.

In preferred embodiments the center-center distance between adjacent contacting devices is small or even very small and in addition the glass tube element is rotated while passing the cooling device (especially the contacting device(s)). It has been proven to lead to an improved straightness if many contacting devices are contacting the glass tube element within the cooling device. Especially if the glass tube element (or the outer surface thereof) has a temperature of around Tg while being contacted an improved straightness can be observed.

In one embodiment it might alternatively or in addition be preferred that at least one of, more than one of, or all of the contacting devices each has, preferably at the same time, contact with two, three, four or more than four areas of the outer surface of the glass tube element by respective contacting areas of the contacting device, wherein preferably the contacting areas and/or the areas of the outer surface contacted by each contacting device are separated from each other.

If the contacting device is designed such that a plurality of parts of the contacting device interact (e.g., contact) with the glass tube element, especially at the outer surface, an improved, more efficient, more comprehensive and faster control of the cooling process can be obtained.

In one embodiment it might alternatively or in addition be preferred that at least a third number, preferably two, three, four or five, of the plurality of contacting devices form a contacting device group, wherein the contacting devices of the contacting device group are arranged, preferably in a rotationally symmetrical manner, around the glass tube element, preferably at least some or all of the third number of contacting devices get in contact with the glass tube element at the same time, at different areas of the outer surface of the glass tube element and/or from different spatial directions.

With appropriate spatial arrangement of the contacting devices a manipulation of the cooling process can be accomplished in a fast and reliable manner. This is true because two or even more contacting devices can get in contact with the glass tube element at the same time and/or from different spatial directions. It has also been proven to have advantageous effects on the properties of the glass tube element if respective arrangements are employed.

In one embodiment it might alternatively or in addition be preferred that the cooling device, especially the contacting device(s), brings the surface temperature of the glass tube element to Tg−200 degrees C. or lower after passing through and/or along the cooling device; and/or wherein at least one or all contacting device(s) has or have, at least in the area where the glass tube element is contacted, especially in the area of the contacting areas, a thermal conductivity of between 1 and 100 W/(m*K), preferably of between 10 and 70 W/(m*K), most preferably of between 30 and 50 W/(m*K).

By employing a design of the contacting devices with defined thermal conductivity a precise control of the cooling process can be obtained. This allows to improve the quality of the glass tube element.

In one embodiment it might alternatively or in addition be preferred that at least one of or all of the contacting devices is or are designed as at least one castor, wherein preferably the glass tube element is moveable, supportable, moved and/or supported along the movement path by means of the castor.

Employing castors allows to have a great design freedom and flexibility. For example different sizes, especially different diameters, different materials, different thermal conductivities and different contacting areas can be achieved with less effort.

For example in at least one cross-sectional plane of the castor, preferably the plane comprising the center axis of the castor, the castor has at least partially at least one V-like recess.

This recess allows to realize two contacting areas between the castor and the glass tube element at the same time. In other words, within the space provided by the "V" the glass tube element can be supported by the castor, hence, the castor provides two side walls which might contact the glass tube element.

A castor further allows to be utilized as a transport means for moving the glass tube element at the same time. This is very economic.

It is acknowledged that one or more castors can also be replaced by a respective number of rolls.

In one embodiment it might be alternatively or in addition preferred that at least one contacting device, especially one or more castors, is temperature-regulated, especially cooled.

This allows to precisely control the temperature difference between the contacting device and the glass material.

In one embodiment it might alternatively or in addition preferred that each castor has at least one contacting area contacting the glass tube element, which contacting area has at least one point which has a distance of 10 cm or less, of 5 cm or less, of 3 cm or less, of 1 cm or less, or of 0.5 cm or less, respectively, from the center axis of the castor.

It has been proven being advantageous if the contact area of the castor is close to the center axis of the castor. This allows that the size of the castor can be limited with an upper value which in turn lead to compact setups and in addition also yields optimal interaction results.

In one embodiment it might alternatively or in addition be preferred that each castor has an outer diameter of 50 cm or less, preferably of 30 cm or less, more preferably of 15 cm or less, even more preferably of 10 cm or less, even more preferably of 5 cm or less, even more preferably of 3 cm or less, and most preferably of 1 cm or less.

It has been proven being advantageous if the size of the castor is limited with an upper value which in turn lead to compact setups and in addition also yields optimal interaction results. The smaller the individual castor is the more castors can be used within small spaces and the more castors can be arranged one after the other. This allows high interaction results.

In one embodiment it might alternatively or in addition be preferred that at least one of or all of the contacting devices is or are designed as at least one chain and/or at least one belt, wherein preferably the glass tube element is moveable, supportable, supported and/or moved along the movement path by means of the chain or the belt.

A chain or a belt allow special contacting geometries for controlling the cooling process.

A chain or a belt further allows to be utilized as a transport means for moving the glass tube element at the same time. This is very economic.

In one embodiment it might alternatively or in addition be preferred that the plurality of contacting devices can be grouped into at least two groups with respect to at least one aspect of the contacting devices such as quantity, diameter, size, spatial location, center-center-distance, thermal conductivity and/or design, especially castor design, belt design or chain design, wherein preferably for each group the value(s) for the respective aspects each is (are) individually selected from the corresponding options as mentioned hereinabove.

If different types of contacting devices are used, the interaction between the cooling device and the glass tube element can be tailored to the specific requirements.

For example for a plurality of contacting devices (e.g., 5 contacting devices) a first group A of contacting devices (e.g., 2 contacting devices) has contacting devices of design A1 (e.g., castor), diameter A2 (e.g., 5 cm), center-center-distance A3 (e.g., 6 cm), spatial location A4 (e.g., centers at 0 cm and 6 cm measured from some reference point) and thermal conductivity A5 (e.g., 30 W/(m*K)). A second group B of contacting devices (e.g., 3 contacting devices) has contacting devices of design B1 (e.g., castor, too), diameter B2 (e.g., 2 cm), center-center-distance B3 (e.g., 3 cm), spatial location B4 (e.g., centers at 10 cm, 13 cm and 16 cm measured, respectively, from the reference point) and thermal conductivity B5 (e.g., 40 W/(m*K)).

In other words, using for each group all possible combinations of parameters allows an improved manufacturing process, hence, improved properties of the glass tube element.

In one embodiment it might alternatively or in addition be preferred that the glass tube element is rotated at least during its period of cooling, preferably (i) dependent on the speed of movement, (ii) with a rotation speed of 1 round or more per second, preferably 5 rounds per second or more and/or (iii) with 0.5 or more, preferably with 1 or more, 3 or more, 5 or more or 10 or more, rotations during it is passed through the cooling device.

Rotating the glass tube element allows to achieve an interaction between the contacting device and the glass tube element around the complete circumference of the glass tube element. Especially, rotating allows a circumferential interaction with only one single contacting device while, of course, also more than one contacting device might be used. This allows to improve the properties of the glass tube element.

If one or more rotations during the time while the glass tube element is passed through the cooling device is conducted, it can be ensured that indeed at least one complete 360 degree interaction has been carried out for the glass tube element.

However, it has been found that in certain situations it might be alternatively or in addition preferred that there is no rotation at all.

The problem is solved by the invention according to a second aspect in that a glass tube element, especially according to the first aspect of the invention, for use as at least one basic part for at least one pharmaceutical container such as a vial, cartridge, ampoule or syringe is proposed.

It has been surprisingly found that due to the improved properties, a glass tube element according to the inventive concept is predestined for pharmaceutical containers.

Thus, a glass tube element can be very useful in the manufacturing process of a pharmaceutical container. For example it can be used in the manufacturing process of vials or syringes.

The problem is solved by the invention according to a third aspect in that a method for producing a glass tube element, especially according to the first aspect of the invention, comprising the steps of: Providing a glass tube line; Guiding the glass tube line during its period of cooling with a defined speed of movement along a defined, preferably horizontally extending, path of movement, wherein along at least one section of the path of movement at least one cooling device is provided, with the glass tube line having at least temporarily a surface temperature of between Tg−50 and Tg+150 degrees C. while passing through and/or along the cooling device; Acting at least temporarily and/or area by area by means of the cooling device on at least one part of the glass tube line passing through or along the cooling device for setting up a locally modified cooling rate of the glass tube line, such that on the shell of the glass tube line different areas are built, with at least one first area having stress values that are in a first range and at least one second area having stress values that are in a second range; and Confectioning of glass tube elements from the glass tube line is proposed.

It has been surprisingly found that the geometric parameters, hence, each of the first and second ratio and the overall quality of the glass tube element can be improved, if the glass tube line undergoes a special treatment during its period of cooling. It has been proven to lead to advantageous results if the process of cooling is influenced by changing the cooling rate of the glass tube line locally.

Preferably the cooling rate of the outer surface of the glass tube line is modified. However, also modifications to the cooling rate elsewhere such as within the shell of the glass tube line might be applied.

If the speed of movement and the path of movement is defined, a higher control of the cooling process can be obtained. Particularly a path of movement which is straight or at least nearly straight has been found as being preferred for a uniform and reproducible interaction.

The inventors assume that applying the mentioned treatment using the cooling device as well as the other settings, respectively, during the cooling process lead to a manipulation of the structure, especially the structure on, beneath and/or near the outer surface, of the glass tube line which in turn lead to improved geometric properties of the same.

In one embodiment it might alternatively or in addition be preferred that the cooling device has at least one contacting device, wherein the contacting device has at least from time to time and/or area by area, preferably direct, contact with at least one area of the outer surface of the glass tube line.

It is the astonish finding that providing a contacting device allows to control the locally existing cooling rate on the surface, respectively of the outer surface, of the glass tube element in a precise, reliable and comfortable manner. It is also possible to control the instance of time when it contacts the glass tube line. This might be controlled for example by a respective spatial placement of the contacting device within the cooling device, such that the glass tube line passes at an earlier or later instant of time along the respective contacting device. Of course, preferably not the entire contacting device must be in contact with the glass tube line, but it may. Also a part thereof might be sufficient. Of course, not the entire outer surface of the glass tube line must have contact with the contacting device, but it may. Also an area of the outer surface of the glass tube line might be sufficient.

These design parameters allow to efficiently control the degree of interaction between the contacting device and the glass tube line. The earlier, the longer and the wider the contact between the contacting device and the glass tube line is, the more interaction between both might take place, hence, the more cooling might take place.

In further preferred embodiments the cooling device has alternatively or in addition at least one fluid dispenser device which is designed to provide a fluid, such as water, fog and/or air, preferably compressed air, preferably at least from time to time and/or area by area, on at least one area of the outer surface of the glass tube line.

Using a fluid allows an improved control of the cooling process of the glass tube line. Especially a high change of the temperature within short time can be achieved that way. This might also be used for supporting the cooling process carried out by the contacting device.

Preferably the fluid dispenser is designed at least in part in form of at least one ring nozzle. This allows that a homogeneous (and circumferential) interaction between the fluid and the glass tube line is achieved. In other words, using ring nozzles allows to cover the complete outer surface of the glass tube line. It has been proven that this lead to an improved straightness of the glass tube line at least in sections.

In also preferred embodiments the fluid dispenser is used as part of an air bearing and/or in combination with a contacting device. This allows to obtain an interaction with reduced or even without contacting the glass tube line with the contacting device. This may reduce contamination effects.

In one embodiment it might alternatively or in addition be preferred that at least one of or all of the contacting devices is or are designed as at least one castor, wherein preferably the glass tube element is moveable, supportable, moved and/or supported along the movement path by means of the castor.

Employing castors allows to have a great design freedom and flexibility. For example different sizes, especially different diameters, different materials, different thermal conductivities and different contacting areas can be achieved with less effort.

For example in at least one cross-sectional plane of the castor, preferably the plane comprising the center axis of the castor, the castor has at least partially at least one V-like recess.

This recess allows to realize two contacting areas between the castor and the glass tube element at the same time. In other words, within the space provided by the "V" the glass tube element can be supported by the castor, hence, the castor provides two side walls which might contact the glass tube element.

A castor further allows to be utilized as a transport means for moving the glass tube element at the same time. This is very economic.

It is acknowledged that one or more castors can also be replaced by a respective number of rolls.

Thus, the inventive concept clearly demonstrates that by varying the spatial absolute and relative position of, the number of and/or the diameter of the contacting devices, especially the castors, it is possible to obtain different interaction patterns, hence, to achieve an optimization of the interaction between the cooling device and the glass tube element. This interaction in turn has been identified by the inventors to yield high quality glass tube elements. Thus, for different purposes and requirements respective parameters can be chosen in a comfortable way. This in turn allows to modify and improve ovality and straightness of the glass tube element.

Of course, it is also possible to change the speed of movement of the glass tube element in order to change the cooling process, hence, the interaction pattern, hence the modification of the ovality and straightness of the glass tube element, thus, improving quality of the glass tube elements. Likewise, it is also possible to change the speed of rotation of the glass tube element in order to change the cooling process, hence, the interaction pattern, hence the modification of the ovality and straightness of the glass tube element, thus, improving quality of the glass tube elements.

In the following further aspects of the invention are described in detail.

Measuring the Optical Properties

The principle of conducting the optical measurements according to the invention is described in further detail below.

FIG. 1 shows an illustration of a cross-sectional plane of a glass tube element 1 according to the invention. The glass tube element 1 has a shell 3 which has an inner surface 5 and an outer surface 7. The outer surface 7 is the surface of the shell 3 facing away from the lumen 8. The plane is perpendicular to the direction of main extension of the glass tube element 1. The glass tube element is immersed in a fluid 9. It might be sufficient if the fluid 9 surrounds the glass tube element 1 so that only the outer surface 7 is in contact with the fluid 9. However, the fluid 9 might be also inside the hollow cylinder so that it contacts also the inner surface 5 as it is the case for the scenario of FIG. 1.

Preferably the fluid has the same optical density as the glass material. The term "the same optical density" here means that the optical density of the fluid and the optical density of the glass material match in three decimal places. Thus, the fluid has the same optical density as the glass material, if the optical density of the fluid and the optical density of the glass material match in three decimal places.

For example 1.3456 and 1.3454 would be the same optical densities according to that definition. For example 1.3456 and 1.3457 would also be the same optical densities according to that definition. A fluid might comprise or be represented by at least one paraffin or at least one oil, respectively, of appropriate optical density.

A light ray 11a extends along a measurement path which extends in a direction of measurement perpendicular to the direction of the main extension of the glass tube element 1. The measurement path is within the drawing plane of FIG. 1. The measurement path is tangent to the surface of the shell 3 facing away from the lumen, i.e., to the outer surface 7. In FIG. 1 the measurement path touches the surface (i.e., the outer surface 7) at a position which can be located within a cylindrical coordinate system (not shown in FIG. 1) fixedly attached to the glass tube element 1 and having its origin on the center axis (not shown in FIG. 1) of the class tube element 1 by means of a height, a radius and an azimuth angle. Assuming that in FIG. 1 at twelve 'o'clock the azimuth angle is zero degrees (and increasing in a clockwise direction), the light ray 11a touches the outer surface 7 at a position having an azimuth angle of 270 degrees.

If the light ray 11a after passing through the glass tube element 1, especially through the shell 3, is analyzed using known optical measurement means (not shown in FIG. 1) a certain value of the optical delay the light ray 11a experienced (inter alia) within the glass tube element 1 can be determined. This optical delay is created due to double refraction in the glass tube element 1 which in turn depends on the mechanical stress state in the respective domains of the shell 3 the light ray 11a passes. Consequently, the optical delay can be regarded as a measure for the stresses in the surface of the shell 3, such as in the outer surface 7 of the shell 3. For different measurements, different positions are chosen where the measurement path touches the outer surface 7 of the shell 3 in the same cross-sectional plane (i.e., for the same height in the coordinate system). In other words, the azimuth angle of the position changes for each measurement.

Thus, if for different measurements the azimuth angle is changed, for example in steps of 1 degree from 0 degrees to 359 degrees, (e.g., by rotating the glass tube element around its center axis in FIG. 1) the optical delay of the light ray 11a for different azimuth angles, hence, for different positions where the measurement path touches the outer surface 7, can be determined in an easy and reliable manner. It is easy to obtain from these measurements the size of the range within which the values of the optical delay for the different azimuth angles fall. For example, if for five measurements at five different azimuth angles the values for the optical delay is, respectively, 40 nm, 45 nm, 50 nm, 55 nm and 60 nm, then the corresponding range is 40 nm through 60 nm and the size of the range is (60 nm−40 nm)=20 nm.

For example, for the optical measurements, the light ray, such as the light ray 11a described above, has a linear polarization which encloses an angle of 45 degrees with the center axis of the glass tube element. For example, the light ray has light of wavelength 630 nm, 633 nm or 635 nm. For example the ambient temperature is room temperature.

Further Glass Properties

The coefficient of linear thermal expansion (CTE) is a measure of characterizing the expansion behavior of a glass when it experiences certain temperature variation. CTE may be the average linear thermal expansion coefficient in a temperature range of from 20° C. to 300° C. as defined in DIN ISO 7991:1987. The lower the CTE, the less expansion with temperature variation. Therefore, in the temperature range of from 20° C. to 300° C. the glass of the wall of the glass tube element of the present invention preferably has a CTE of less than 12 ppm/K, more preferably less than 10.0 ppm/K, more preferably less than 9.0 ppm/K, more preferably less than 8.0 ppm/K, more preferably less than 7 ppm/K, more preferably less than 6.5 ppm/K. However, the CTE should also not be very low. Preferably, in the temperature range of from 20° C. to 300° C. the CTE of the glasses of the present invention is more than 3 ppm/K, more preferably more than 4 ppm/K, more preferably more than 5 ppm/K, more preferably more than 6 ppm/K. In order for the glasses to be well suitable for chemical toughening, the glasses may contain relatively high amounts of alkali metal ions, preferably sodium ions. However, thereby the average linear thermal expansion coefficient CTE in the temperature range between 20° C. and 300° C. is increased. Preferably, the glass of the wall of the glass tube element of the invention has a CTE higher than $7*10^{-6}$/° C., more preferably higher than $8*10^{-6}$/° C., more preferably higher than $9*10^{-6}$/° C. However, a high CTE also complicates production of the glasses by direct hot-forming. Therefore, the glasses preferably have a CTE lower than $13*10^{-6}$/° C.

The transition temperature of the glass used for the wall of the glass tube element may be higher than 300° C., higher than 500° C., higher than 520° C., higher than 530° C., higher than 550° C., or even higher than 600° C. The transition temperature of the wall of the glass tube element may be lower than 900° C., lower than 800° C., lower than 700° C., lower than 650° C., or lower than 630° C. Generally, a low transition temperature usually includes lower energy costs for melting the glass and for processing. Also, the glass will usually have a lower fictive temperature if the transition temperature is low. Hence, the glass will be less prone to irreversible thermal shrinkage during optional chemical toughening, if the transition temperature is higher.

The glass tube element should be manufactured with a high purity and it should feature a good resistance, especially against alkaline solutions. The resistance against alkaline solutions is important for the use of glass tube elements. Alkaline solutions are often used as cleaning agents for glass tube elements. Preferably, the glass tube element has an alkaline resistance according to DIN ISO 695:1994 of class A3, of A2, or even of A1. Alkaline resistance means resistance to attack by aqueous alkaline solutions at 50° C. High chemical stability and/or a high alkaline resistance will lead to strongly reduced precipitation or leakage of substances out of the glass tube element for example when the glass tube element is in contact with fluids such as juice, tea or dishwasher water. Leakage of substances out of the glass tube element will change the chemical composition of the surface of the glass from which substances have leaked. This might lead negative effects on the appearance and should therefore be avoided.

The average surface roughness ($R_a$) is a measure of the texture of a surface. It is quantified by the vertical deviations of a real surface from its ideal form. Commonly amplitude parameters characterize the surface based on the vertical deviations of the roughness profile from the mean line. $R_a$ is arithmetic average of the absolute values of these vertical deviations. The roughness can be measured with atomic force microscopy. The inner surface and/or outer surface of the glass tube element preferably has an average surface roughness Ra of less than 30 nm, of less than 10 nm, of less than 5 nm, of less than 2 nm, of less than 1 nm. In some embodiments, the surface roughness Ra is less than 0.5 nm. A smaller inner and/or outer surface roughness reduces the amount residual fluid. Residual fluid within the glass tube element can give rise to growth of microorganisms which could harm the health of animals or humans. Furthermore, a smaller outer surface roughness gives a more pleasant feeling when holding the glass tube element in the hand. The mentioned roughness values can be obtained by fire-polishing the glass.

Glass Compositions

The glass used for the wall of the glass tube element is not limited to a specific glass composition. The glass may be selected from the group consisting of soda-lime glass, borosilicate glass, alkaline-resistant glass and aluminosilicate glass. Optionally, a borosilicate glass is used.

The glass of the glass tube element preferably comprises the following components in the indicated amounts (in wt. %):

| Component | Content (wt. %) |
| --- | --- |
| $SiO_2$ | 40 to 85 |
| $Al_2O_3$ | 0 to 25 |
| $Na_2O$ | 0 to 18 |
| $K_2O$ | 0 to 15 |
| MgO | 0 to 10 |
| $B_2O_3$ | 0 to 22 |
| $Li_2O$ | 0 to 10 |
| ZnO | 0 to 5 |
| CaO | 0 to 16 |
| BaO | 0 to 12 |
| $ZrO_2$ | 0 to 5 |
| $CeO_2$ | 0 to 0.5 |
| $SnO_2$ | 0 to 3 |
| $P_2O_5$ | 0 to 15 |
| $Fe_2O_3$ | 0 to 1.5 |
| $TiO_2$ | 0 to 10 |
| SrO | 0 to 1 |

-continued

| Component | Content (wt. %) |
| --- | --- |
| F | 0 to 1 |
| Cl | 0 to 1 |

$SiO_2$ is a relevant network former that can be used in the glass used for this of the invention. Therefore, the glasses may comprise $SiO_2$ in an amount of at least 60 wt. %. More preferably, the glass comprises $SiO_2$ in an amount of at least 62 wt. %, at least 65 wt. %, at least 68 wt. %, more than 70 wt. %, or even more than 75 wt. %. However, the content of $SiO_2$ in the glass should also not be extremely high because otherwise the meltability may be compromised. The amount of $SiO_2$ in the glass may be limited to at most 85 wt. %, or at most 82 wt. %. In embodiments, the content of $SiO_2$ in the glass is from 60 to 85 wt. %, or from >65 to 75 wt. %.

$B_2O_3$ may be used in order to enhance the network by increasing the bridge-oxide in the glass via the form of $[BO_4]$ tetrahedra. It also helps to improve the damage resistance of the glass. However, $B_2O_3$ should not be used in high amounts in the glass since it can decrease the ion-exchange performance. Furthermore, addition of $B_2O_3$ can significantly reduce the Young's modulus. The glass may comprise $B_2O_3$ in an amount of from 0 to 20 wt. %, preferably from 0 to 15 wt. %, preferably from 0.1 to 13 wt. %. In embodiments, the glass preferably comprises at least 5 wt. %, more preferably at least 7 wt. %, or at least 10 wt. % of $B_2O_3$.

$P_2O_5$ may be used in the glass of the invention in order to help lowering the melting viscosity by forming $[PO_4]$ tetrahedra, which can significantly lower the melting point without sacrificing anti-crystallization features. Limited amounts of $P_2O_5$ do not increase geometry variation very much, but can significantly improve the glass melting, forming performance, and ion-exchanging (chemical toughening) performance. However, if high amounts of $P_2O_5$ are used, geometry expansion upon chemical toughening may be increased significantly. Therefore, the glasses may comprise $P_2O_5$ in an amount of from 0 to 4 wt. %, or from 0 to 2 wt. %. In some embodiments, the glass is free of $P_2O_5$.

It is believed that $Al_2O_3$ can easily form tetrahedra coordination when the alkaline oxide ratio content is equal or higher than that of $Al_2O_3$. $[AlO_4]$ tetrahedra coordination can help building up more compact network together with $[SiO_4]$ tetrahedra, which can result in a low geometry variation of the glass. $[AlO_4]$ tetrahedra can also dramatically enhance the ion-exchange process during chemical toughening. Therefore, $Al_2O_3$ is preferably contained in the glasses in an amount of at least 0 wt. %, more preferably of more than 1 wt. %, more preferably of more than 4 wt. %. However, the amount of $Al_2O_3$ should also not be very high because otherwise the viscosity may be very high so that the meltability may be impaired. Therefore, the content of $Al_2O_3$ in the glasses is preferably at most 20 wt. %, at most 12 wt. %, or at most 10 wt. %. In preferred embodiments, the content of $Al_2O_3$ in the glasses is from 0 to 20 wt. %, from 1 to 12 wt. %, from 4 to 10 wt. %.

$TiO_2$ can also form $[TiO_4]$ and can thus help building up the network of the glass, and may also be beneficial for improving the acid resistance of the glass. However, the amount of $TiO_2$ in the glass should not be very high. $TiO_2$ present in high concentrations may function as a nucleating agent and may thus result in crystallization during manufacturing. Preferably, the content of $TiO_2$ in the glasses is from 0 to 10 wt. %, or up to 7 wt. %. In some embodiments, the glass comprises at least 0.5 wt. %, at least 2 wt. %, or at least 3 wt. % of $TiO_2$. In an embodiment, the glass is free of $TiO_2$.

$ZrO_2$ has the functions of lowering the CTE and improving the alkaline resistance of a glass. It may increase the melting viscosity, which can be suppressed by using $P_2O_5$. Like alkaline metals, $Zr^{4+}$ is also a network modifier. Furthermore, $ZrO_2$ is a significant contributor for increased Young's modulus. Preferably, the content of $ZrO_2$ in the glasses is from 0 to 5 wt. %, up to 2 wt. %. The glass may be free of $ZrO_2$. In some embodiments, the glass comprises at least 0.1 wt. %, or at least 0.2 wt. % $ZrO_2$.

Alkaline oxides $R_2O$ ($Li_2O+Na_2O+K_2O+Cs_2O$) may be used as network modifiers to supply sufficient oxygen anions to form the glass network. Preferably, the content of $R_2O$ in the glasses is more than 4 wt. %, or more than 12 wt. %. However, the content of $R_2O$ in the glass should not be very high because otherwise chemical stability and chemical toughenability may be impaired. Preferably, the glasses comprise $R_2O$ in an amount of at most 30 wt. %, at most 25 wt. %, or at most 20 wt. %. Other embodiments are free of alkaline oxides, or at least free of $Na_2O$, $K_2O$, $Cs_2O$ and/or $Li_2O$ $Li_2O$ can help improving the Young's modulus and lowering CTE of the glass. $Li_2O$ also influences the ion-exchange greatly. It was surprisingly found that Li-containing glass has a smaller geometry variation. Therefore, the content of $Li_2O$ in the glasses may be set to at least 0 wt. %, or more than 5 wt. %, or even more than 10 wt. %. However, the content of $Li_2O$ should not be very high because otherwise chemical stability and chemical toughenability may be impaired. Preferably, the content of $Li_2O$ in the glasses is at most 24 wt. %, less than 15 wt. %, or even 0 wt. %.

$Na_2O$ may be used as a network modifier. However, the content of $Na_2O$ should not be very high because otherwise chemical stability and chemical toughenability may be impaired. Preferably, the content of $Na_2O$ in the glasses is from 0 to 15 wt. %, preferably from 2 to 15 wt. %. In preferred embodiments, the content of $Na_2O$ in the glasses is at least 5 wt. %, at least 8 wt. %, or at least 10 wt. %.

$K_2O$ may be used as a network modifier. However, the content of $K_2O$ should not be very high because otherwise chemical stability and chemical toughenability may be impaired. Preferably, the content of $K_2O$ in the glasses is from 0 to 15 wt. %, or from >0.5 to 7 wt. %. The glass may be free of $K_2O$.

Preferably, the glasses comprise more $Na_2O$ than $K_2O$. Thus, preferably the molar ratio $Na_2O/(Na_2O+K_2O)$ is from >0.5 to 1.0, from >0.6 to 1.0, from >0.7 to 1.0, or from >0.8 to 1.0.

Preferably, the content of the sum of $Li_2O$ and $Na_2O$ in the glasses is more than 10 mol-%, or more than 15 mol-%. However, the content of the sum of $Li_2O$ and $Na_2O$ in the glasses should not be very high. Preferably, the content of the sum of $Li_2O$ and $Na_2O$ in the glasses is at most 25 mol-%, or at most 20 mol-%.

The glasses may also comprise alkaline earth metal oxides as well as ZnO which are collectively termed "RO" in the present specification. Alkaline earth metals and Zn may serve as network modifiers. Preferably, the glasses comprise RO in an amount of from 0 to 20 wt. %, preferably from 0 to 15 wt. %. In some embodiments, the glass preferably comprises at least 0.5 wt. %, more preferably at least 1 wt. %, more preferably at least 5 wt. % of RO. Preferred alkaline earth metal oxides are selected from the group consisting of MgO, CaO, SrO und BaO. More preferably, alkaline earth metals are selected from the group consisting of MgO und CaO. More preferably, the alkaline earth metal is MgO. Preferably, the glass comprises MgO in an amount of from 0 to 10 wt. %. In some embodiments, the glass comprises at least 0.5 wt. %, at least 1 wt. %, or at least 2 wt. % of MgO. Preferably, the glass comprises CaO in an amount of from 0 to 16 wt. %, preferably from 0 to 13 wt. %, preferably from 0 to 10 wt. %. In some embodiments, the glass comprises at least 0.5 wt. %, at least 1 wt. %, at least 5 wt. %, at least 10 wt. %, or at least 12 wt. % of CaO. Preferably, the glass comprises BaO in an amount of from 0 to 12 wt. %, preferably from 0 to 10 wt. %. In some embodiments, the glass comprises at least 0.5 wt. %, at least 2 wt. %, or at least 7 wt. % of BaO. The glass may be free of BaO, MgO and/or CaO.

Preferably, the glass comprises ZnO in an amount of from 0 to 5 wt. %. In some embodiments, the glass comprises at least 0.5 wt. %, at least 1 wt. %, or at least 2 wt. % of ZnO. In other embodiments, the glass is free of ZnO. Preferably, the content of the sum of MgO and ZnO in the glasses is from 0 to 10 wt. %. In some embodiments, the content of the sum of MgO and ZnO in the glasses at least 0.5 wt. %, more preferably at least 1 wt. %, more preferably at least 2 wt. %.

At the end, when forming a glass by mixing different types of the oxides, the integrated effect should be considered to achieve a glass with comparatively low expansion, which is supported by high densification of the glass network. It means, in addition to [$SiO_4$] tetrahedral [$BO_4$] tetrahedra, [$AlO_4$] tetrahedra, or [$PO_4$] tetrahedra are expected to help connect the [$SiO_4$] more effectively rather than other type of polyhedrons. In other words, [$BO_3$] triangle and [$AlO_6$] octahedron, for instance, are not preferred. It means, sufficient oxygen anions are preferable to be offered by adding proper amounts of metal oxides, such as $R_2O$ and RO.

Preferably, the content of $SnO_2$ in the glasses is from 0 to 3 wt. %. More preferably, the glasses are free of $SnO_2$. Preferably, the content of $Sb_2O_3$ in the glasses is from 0 to 3 wt. %. More preferably, the glasses are free of $Sb_2O_3$. Preferably, the content of $CeO_2$ in the glasses is from 0 to 3 wt. %. High contents of $CeO_2$ are disadvantages because $CeO_2$ has a coloring effect. Therefore, more preferably, the glasses are free of $CeO_2$. Preferably, the content of $Fe_2O_3$ in the glasses is from 0 to 3 wt. %. More preferably, the glasses are free of $Fe_2O_3$.

The glass described herein is described as having a composition of different constituents. This means that the glass contains these constituents without excluding further constituents that are not mentioned. However, in preferred embodiments, the glass consists of the components mentioned in the present specification to an extent of at least 95%, more preferably at least 97%, most preferably at least 99%. In most preferred embodiments, the glass essentially consists of the components mentioned in the present specification.

Optionally, coloring oxides can be added, such as $Nd_2O_3$, $Fe_2O_3$, CoO, NiO, $V_2O_5$, $MnO_2$, CuO, $CeO_2$, $Cr_2O_3$.

0-2 wt. % of $As_2O_3$, $Sb_2O_3$, $SnO_2$, $SO_3$, Cl and/or F could be also added as refining agents. 0-5 wt. % of rare earth oxides could also be added to add optical or other functions to the glass wall.

The terms "X-free" and "free of component X", or "0% of X", respectively, as used herein, refer to a glass, which essentially does not comprise said component X, i.e., such component may be present in the glass at most as an impurity or contamination, however, is not added to the glass composition as an individual component. This means that the component X is not added in essential amounts.

Non-essential amounts according to the present invention are amounts of less than 100 ppm, preferably less than 50 ppm and more preferably less than 10 ppm. Preferably, the glasses described herein do essentially not contain any components that are not mentioned in this description.

In embodiments, the glass used for the glass tube element has the following composition in percent by weight:

| Component | Content (wt. %) |
|---|---|
| $SiO_2$ | 40 to 85 |
| $Al_2O_3$ | 0 to 25 |
| $Na_2O$ | 2 to 18 |
| $K_2O$ | 0 to 15 |
| MgO | 0 to 10 |
| $B_2O_3$ | 0 to 15 |
| $Li_2O$ | 0 to 10 |
| ZnO | 0 to 5 |
| CaO | 0 to 10 |
| BaO | 0 to 5 |
| $ZrO_2$ | 0 to 5 |
| $CeO_2$ | 0 to 0.5 |
| $SnO_2$ | 0 to 3 |
| $P_2O_5$ | 0 to 15 |
| $Fe_2O_3$ | 0 to 1.5 |
| $TiO_2$ | 0 to 10 |
| SrO | 0 to 1 |
| F | 0 to 1 |
| Cl | 0 to 1 |

In embodiments, the glass used for the glass tube element has the following composition in percent by weight:

| Component | Content (wt. %) |
|---|---|
| $SiO_2$ | 55 to 65 |
| $Al_2O_3$ | 10 to 20 |
| $Na_2O$ | 0 to 3 |
| $K_2O$ | 0 to 3 |
| MgO | 0 to 5 |
| $B_2O_3$ | 0 to 6 |
| $Li_2O$ | 0 to 3 |
| ZnO | 0 to 3 |
| CaO | 7 to 15 |
| BaO | 5 to 10 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

In embodiments, the glass used for the glass tube element has the following composition in percent by weight:

| Component | Content (wt. %) |
|---|---|
| $SiO_2$ | 65 to 85 |
| $Al_2O_3$ | 0 to 7 |
| $Na_2O$ | 0.5 to 10 |
| $K_2O$ | 0 to 10 |
| MgO | 0 to 3 |
| $B_2O_3$ | 8 to 20 |
| $Li_2O$ | 0 to 3 |
| ZnO | 0 to 3 |
| CaO | 0 to 3 |
| BaO | 0 to 3 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

In embodiments, the glass used for the glass tube element has the following composition in percent by weight:

| Component | Content (wt. %) |
|---|---|
| $SiO_2$ | 60 to 80 |
| $Al_2O_3$ | 0 to 5 |
| $Na_2O$ | 10 to 18 |
| $K_2O$ | 0 to 5 |
| MgO | 0 to 5 |
| $B_2O_3$ | 0 to 5 |
| $Li_2O$ | 0 to 3 |
| ZnO | 0 to 3 |
| CaO | 2 to 10 |
| BaO | 0 to 5 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

Optional Additional Treatment of the Glass Tube Element

For optional chemical toughening, the glass may be immersed in a salt bath. The salt bath may contain sodium and/or potassium salts. The salt for the salt bath may comprise Na, K or Cs nitrate, sulfate or chloride salts or a mixture of one or more thereof. Preferred salts are $NaNO_3$, $KNO_3$, NaCl, KCl, $K_2SO_4$, $Na_2SO_4$, $Na_2CO_3$, $K_2CO_3$, or combinations thereof. Additives like NaOH, KOH and other sodium or potassium salts may also be used for better controlling the speed of ion-exchange, compressive stress and DoL during chemical toughening. In an embodiment, the salt bath comprises $KNO_3$, $NaNO_3$, $CsNO_3$ or mixtures thereof.

The temperature during chemical toughening may range from 320° C. to 700° C., from 350° C. to 500° C., or from 380° C. to 450° C. If the toughening temperature is very low, the toughening rate will be low. Therefore, chemical toughening is preferably done at a temperature of more than 320° C., more preferably more than 350° C., more preferably more than 380° C., more preferably at a temperature of at least 400° C. However, the toughening temperature should not be very high because very high temperatures may result in strong compressive stress relaxation and low compressive stress. Preferably, chemical toughening is done at a temperature of less than 500° C., more preferably less than 450° C.

The time for chemical toughening may range from 5 min to 48 h, from 10 min to 20 h, from 30 min to 16 h, or from 60 min to 10 h. In preferred embodiments, the duration of chemical toughening is of from 0.5 to 16 h. Chemical toughening may either done in a single step or in multiple steps, in particular in two steps. If the duration of toughening is very low, the resulting DoL may be very low. If the duration of toughening is very high, the CS may be relaxed very strongly. The duration of each toughening step in a multistep toughening procedure is preferably between 0.05 and 15 hours, more preferably between 0.2 and 10 hours, more preferably between 0.5 and 6 hours, more preferably between 1 and 4 hours. The total duration of chemical toughening, in particular the sum of the durations of the two or more separate toughening steps, is preferably between 0.01 and 20 hours, more preferably between 0.2 and 20 hours, more preferably between 0.5 and 15 hours, more preferably between 1 and 10 hours, more preferably between 1.5 and 8.5 hours. Glass tube element may be chemically toughened such that it has a DoL of at least 10 µm, or at least 20 µm. In some embodiments, the DoL may be up to 80 µm, up to 60 µm or up to 50 µm.

In some embodiments, the glass is chemically toughened with a mixture of $KNO_3$ and $NaNO_3$. In embodiments, the mixture comprises less than 50 mol % $NaNO_3$, less than 30 mol % $NaNO_3$, less than 20 mol % $NaNO_3$, less than 10 mol % $NaNO_3$, or less than 5 mol % $NaNO_3$. In some embodiments, the glass is chemically toughened with a mixture of $KNO_3$ and $CsNO_3$. In embodiments, the mixture comprises less than 50 mol % $CsNO_3$, less than 30 mol % $CsNO_3$, less than 20 mol % $CsNO_3$, less than 10 mol % $CsNO_3$, or less than 5 mol % $CsNO_3$. The balance may be $KNO_3$.

Chemical toughening with both $KNO_3$ and $NaNO_3$ may be done by using a mixture of $KNO_3$ and $NaNO_3$ or by performing separate toughening steps with essentially pure $NaNO_3$ and essentially pure $KNO_3$. Also in embodiments in which the glass is chemically toughened with mixtures of $KNO_3$ and $NaNO_3$, preferably two distinct consecutive toughening steps are performed. Preferably, the proportion of $KNO_3$ in the mixture used for the second toughening step is higher than the proportion of $KNO_3$ in the mixture used for the first toughening step. The chemical toughening can include multi steps in salt baths with alkaline metal ions of various concentrations to reach better toughening performance.

The toughening can be done by immersing the glass into a molten salt bath of the salts described above, or by covering the glass with a paste containing the ions described above, e.g., potassium ions and/or other alkaline metal ions, and heating to a high temperature for a certain time. The alkaline metal ions with larger ion radius in the salt bath or the paste exchange with alkaline metal ions with smaller radius in the glass article, and surface compressive stress is formed due to ion exchange.

A chemically toughened glass tube element of the invention may be obtained by chemically toughening at least the wall of the glass tube element of the present invention. The toughening process can be done by partially or completely immersing the glass tube element, the glass tube, the glass wall, or any intermediate glass article into an above-described salt bath, or subjecting it to a salt paste. The monovalent ions in the salt bath have radii larger than alkali ions inside the glass. A compressive stress to the glass is built up after ion-exchange due to larger ions squeezing in the glass network. After the ion-exchange, the strength and flexibility of the glass is surprisingly and significantly improved. In addition, the compressive stress induced by chemical toughening may increase scratch resistance of the glass tube element. Improved scratch resistance is particularly relevant for glass tube elements because scratches affect both mechanical and chemical resistance of a glass surface as well as optical appearance.

After chemical toughening, the glass tubes are taken out of the salt bath, then cleaned with water and dried. Compressive stress layers are formed on the outer surface and/or inner surface of strengthened glass tubes. Correspondingly, a tensile stress is formed in the core part of the glass tubing wall.

It is acknowledged that preferably any existing stress layers or stress patterns may be superimposed with the stress layers or stress patterns introduced by subsequent chemical toughening. Especially the depth of the stress layers/patterns introduced by chemical toughening may be for example 50 µm while other stress layers/patterns may extend across the entire depth of the glass material. This might lead to the situation that any former stress layers/patterns or parts thereof is or are at least in some volume/surface domains biased by some value dependent on the chemical toughening process.

Toughening

One or more types of toughening might be applied to the glass tube element during the manufacturing process. For example a glass tube element might be chemically toughened and/or physically toughened. Both types of toughening are explained in detail elsewhere in this application.

The threshold diffusivity D of the wall of the glass tube element preferably is at least 1.5 µm$^2$/hour, more preferably at least 4 µm$^2$/hour. The chemical toughening performance of glass can be described by the threshold diffusivity D. The threshold diffusivity D can be calculated from the measured depth of layer (DoL) and the ion exchange time (IET) according to the relationship: DoL=~1.4 sqrt (4*D*IET). The threshold diffusivity may for example be measured when chemically toughening the glass at 410° C. in $KNO_3$ for 8 hours. The glass used for the glass tube element may have excellent chemical toughening performance which allows for a very economic production. Thus, the glass may have a threshold diffusivity D of at least 1.5 µm$^2$/hour. Preferably, the glass of the present invention has a threshold diffusivity D of at least 4 µm$^2$/hour, at least 6 µm$^2$/hour, at least 8 µm$^2$/hour, at least 10 µm$^2$/hour, at least 12 µm$^2$/hour, at least 14 µm$^2$/hour, at least 16 µm$^2$/hour, at least 18 µm$^2$/hour, at least 20 µm$^2$/hour, at least 25 µm$^2$/hour, at least 30 µm$^2$/hour, at least 35 µm$^2$/hour, or even at least 40 µm$^2$/hour. In an embodiment, the threshold diffusivity is up to 60 µm$^2$/hour or up to 50 µm$^2$/hour.

In some embodiments chemical toughening is employed.

Cutting Mechanism

In preferred embodiments at least one out of three cutting mechanisms might be applied for manufacturing the glass tube elements, i.e., to prepare the desired length of each glass tube element from a longer glass element such as a glass tube line: 1. scratching, which means that at desired positions the longer glass element is scratched and broken in order to obtain the individual glass tube elements. This technique might be also referred to as "score broken". 2. Sawing, which means that at the desired positions the longer glass element is sawed so that individual glass tube elements are obtained. 3. Laser cutting, which means that the individual glass tube elements are obtained in that a laser cuts the individual pieces from the longer glass element.

In preferred embodiments a laser cutting technique is employed.

Polishing

In preferred embodiments all or at least one or more parts of the glass tube elements can be made subject to fire polishing. This means that the material is exposed to a flame or heat, for example during drawing of the glass tube or afterwards. This might result in a smoothening of the surface. Preferably at least the end sections of the glass tube elements are fire polished. More preferably the entire glass tube element is fire polished, at least its outer surface. Reference is also made to the discussion made with respect to surface roughness above.

DETAILED DESCRIPTION

Figure 2A:
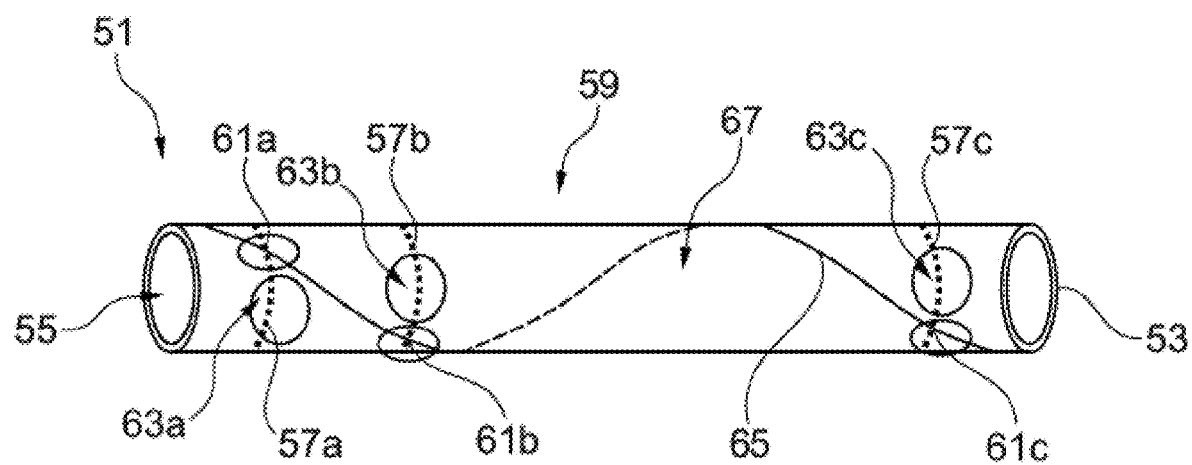
FIG. 2a shows a first glass tube element according to the invention.

FIG. 2a shows a first glass tube element 51 according to the invention.

It has a hollow cylindrical form (not only a section thereof, but entirely) and a shell 53 which encloses a lumen 55. The length (this is, from left to right) of the glass tube element 51 is 1.5 m.

A path 57a extending on the surface 59 of the shell 53 facing away from the lumen 55 is or can be defined.

The path 57a follows across the entire outer circumference of the glass tube element 51 the intersection line which is or can be obtained by the intersection of a plane perpendicular to the center axis of the glass tube element 51 and the surface 59 of the shell 53 facing away from the lumen 55. In other words, path 57a is the intersection line.

The path 57a extends across at least one second area 61a (indicated by a circle) of the shell 53, where the stress values lies within a second interval. The path 57a extends also across at least one first area 63a (indicated by another circle) of the shell 53, where the stress values lies within a first interval.

Indeed, the second area 61a and first area 63a are surface areas (two-dimensional areas) of the outer surface 59 of the shell 53.

A plurality of parallel running paths 57b and 57c of the defined kind (i.e., corresponding to parallel shifted versions of path 57a) can be defined and/or identified in FIG. 2a. For each one of the paths 57b, 57c, likewise as described with respect to path 57a, a second area 61b, 61c and a first area 63b, 63c can be identified.

A single second group of second areas 61a, 61b, 61c can be defined, wherein the second areas 61a, 61b, 61c of the second group are connected with each other by means of a connected second super-area 65 of the shell 53. The values of the stress within the second super-area 65 lie within the second interval.

A single first group of first areas 63a, 63b, 63c can be defined, wherein the first areas 63a, 63b, 63c of the first group are connected with each other by means of a connected first super-area 67 of the shell 53. The values of the stress within the first super-area 67 lie within the first interval.

Obviously, there is one first super area and one second super area.

On the unrolled cylinder shell 53 (not separately shown) the second super-area is designed in form of at least one stripe (the number of stripes actually depends on where the cylinder shell 53 starts to be unrolled). In case of more than one stripe, the stripes are parallel to each other.

On the unrolled cylinder shell 53 the first super-area is designed in form of at least two stripes (the number of stripes depends on where the cylinder shell 53 starts to be unrolled). The stripes are parallel to each other.

It is acknowledged that the circled areas indicative for the first areas 63a, 63b, 63c (see FIG. 2a) can indeed be chosen arbitrarily to a large extent without departing from the scope of the present invention, as long as they do at least not comprise parts of a second area or another first area here. For the definition of each first area it is the crucial aspect that the stress values within that area are within the first interval. This does not exclude that outside of the first area (e.g., outside of first areas 63a, 63b, 63c) the stress values still are within the first interval. Indeed, one or more areas which are outside of the first areas might be within a first super-area (e.g., the first super-area 67), for which again the stress values have to lie within the first interval.

The same applies mutatis mutandis also for the second areas and second super-area. It is acknowledged that at least for the situation in FIG. 2a, of course, second areas 61a, 61b, 61c are always and can be only part of the second super-area 65. The circles indicative for the second areas 61a, 61b, 61c in FIG. 2a might nevertheless cover parts of the first super-area 67. However, this is only due to illustrative purposes because in FIG. 2a the second areas are too small in order to indicate them alone by a single circle.

For example in FIG. 2a with the first and second areas defined as described above, along the path (e.g., path 57a), in no cases does the first area follow directly on the respective second area. However, if the first areas are chosen differently, it would be possible that at least in one direction along the path (e.g., path 57a) the first area follows directly on the respective second area.

When conducting optical measurements on the glass tube element 51 by means of at least one light ray which extends along a measurement path, which measurement path extends in a direction of measurement perpendicular to the direction of the main extension of the glass tube element 51 and which measurement path is tangent to the surface of the shell 53 facing away from the lumen, namely the outer surface of the shell 53, and which measurement path touches the surface for different measurements at different positions each having a different azimuth angle within a cylindrical coordinate system fixedly attached to the glass tube element 51 and having its origin on the center axis of the glass tube element 51, the optical delays of the light ray obtained from the different measurements have values which all fall within a range having a size of between 3 and 30 nm.

Indeed, for the glass tube element 51 the different positions may be on one of the paths 57a, 57b or 57c (or every path shifted parallel along the center axis of the glass tube element 51).

Figure 2B:
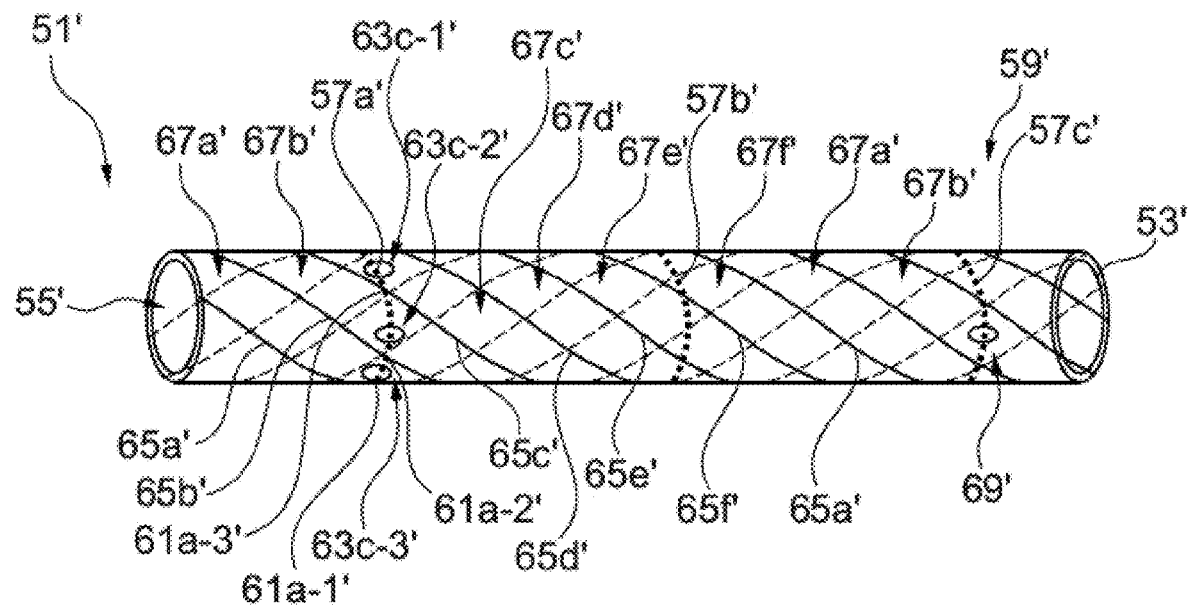
FIG. 2b shows a second glass tube element according to the invention.

FIG. 2b shows a second glass tube element 51' according to the invention. Features which are structural similar or identical to the features of the glass tube element 51 are denoted with the same reference numerals but single dashed. Due to the similarity between glass tube element 51 and glass tube element 51', only the differences need to be discussed here while for the remainder reference can be made to the discussion provided above with respect to FIG. 2a.

Glass tube element 51' has a plurality of second super-areas 65a', 65b', 65c', 65d', 65e', 65f' (i.e., a number of 6 thereof) and it has a plurality of first super-areas 67a', 67b', 67c', 67d', 67e', 67f' (i.e., a number of 6 thereof).

A path 57a' crosses a plurality of second areas (such as second areas 61a-1', 61a-2' and 61a-3') as well as a plurality of first areas (such as first areas 63a-1', 63a-2' and 63a-3'). However, due to lack of space only the first areas 63a-1', 63a-2' and 63a-3' are indicated by a circle and the first and second areas on the backside of the glass tube element 51' are not labeled at all.

The same task can be made for parallel shifted paths such as paths 57b' and 57c'. However, FIG. 2b is not populated with more reference signs for the sake of keeping a clear overview.

For appropriate chosen paths (which may include paths 57a', 57b' and 57c'), second groups of second areas can be built, wherein the second areas of each of the second groups are connected with each other by means of a respective connected second super-area 65a', 65b', 65c', 65d', 65e', 65f' of the shell 53'. The values of the stress within the second super-areas 65a'-65f' lie within the second interval.

For appropriate chosen paths (which may include paths 57a', 57b' and 57c'), first groups of first areas can be built, wherein the first areas of each of the first groups are connected with each other by means of a respective connected first super-area 67a', 67b', 67c', 67d', 67e', 67f' of the shell 53'. The values of the stress within the first super-areas 66a'-67f' lie within the first interval.

For example, the first area 63c-1' and the first area 69' can be grouped within the same of the plurality of first groups because first area 63c-1' and first area 69' are connected with each other by means of the connected first super-area 67b'. In contrast thereto, e.g., first area 63c-2' and first area 69' are not connected by any common super-area because they are separated by a second super-area having different stress values.

Obviously, there are six first super areas and six second super areas.

On the unrolled cylinder shell 53' (not separately shown) the second super-areas are designed in form of (more than six) stripes which are parallel to each other. On the unrolled cylinder shell 53' (not separately shown) the first super-areas are designed in form of (more than six) stripes which are parallel to each other. The actual number of stripes depend on where the cylinder shell 53' is started to be unrolled.

Figure 3:
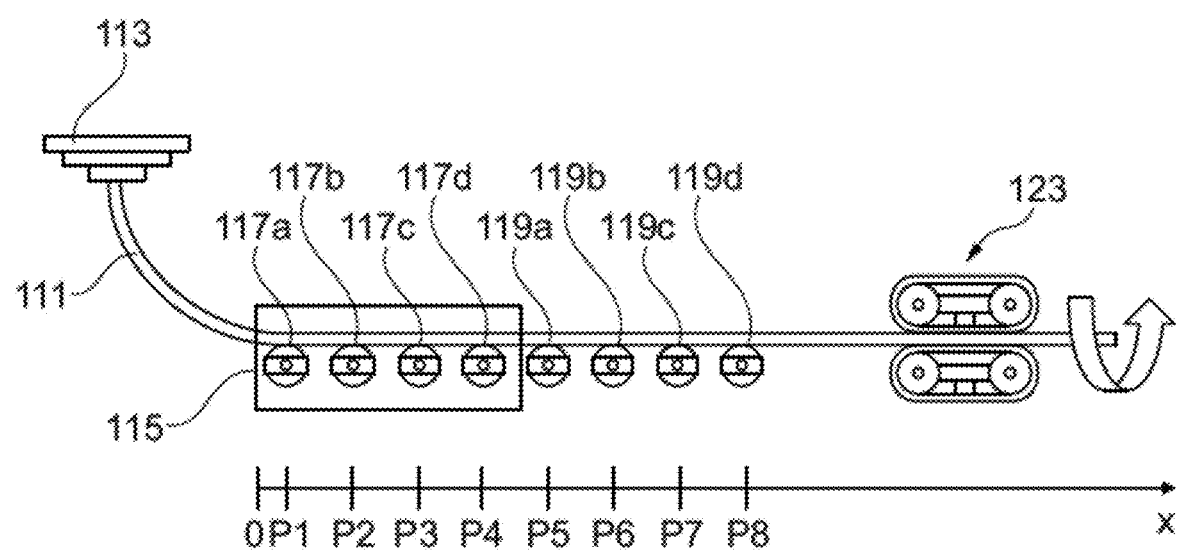
FIG. 3 shows a schematic illustration of a first exemplary production line.

FIG. 3 shows a schematic illustration of a first exemplary production line for producing a glass tube element such as the glass tube element 51 or 51'.

A glass tube line 111 formed by some forming device 113 is redirected into a horizontal direction. The forming device 113 is not specified in more detail here, but it may be designed for conducting for example a Danner process or a Vello process.

It is acknowledged that the glass tube element is part of the glass tube line 111. Alternatively it might be stated that the glass tube element during its production process is connected to further glass tube elements in one piece. From the glass tube line 111 subsequently glass tube elements, such as the glass tube element 51 or 51', are confectioned.

Therefore, even if reference is made to the glass tube line 111, the person skilled in the art clearly understands that every treatment the glass tube line 111 undergoes is also applied to the glass tube elements because these elements correspond to respective sections of the glass tube line 111. Vice versa the same is true: If it is stated that a glass tube element is treated somehow, this is the same as if the glass tube line, from which the glass tube element has been confectioned, is treated that way (unless otherwise stated or evident from the context).

Starting from a Position of x=0 (see FIG. 3) the glass tube line 111 runs in a horizontal direction parallel to the x axis corresponding to a defined path of movement. The glass tube line 111 has a defined speed of movement, preferably of 30 cm/s. The glass tube line 111, hence the glass tube element corresponding to the respective section of the glass tube line 111, passes with the defined speed of movement through a cooling device 115, for setting up a locally modified cooling rate of the glass tube line 111 (hence the glass tube elements). The glass tube line 111 has at least temporarily a surface temperature of between Tg−50 and Tg+150 degrees C. while passing through the cooling device 115. Tg means the transition temperature.

The cooling device 115 has a plurality of four contacting devices 117a-117d. Each contacting device 117a-117d is designed in form of a castor. The contacting devices 117a-117d has at least from time to time direct contact with at least one area of the outer surface of the glass tube line 111 (hence the corresponding glass tube elements).

To be more precise, the four contacting devices 117a-117d comes in contact with the outer surface of the glass tube element (i.e., the respective section of the glass tube line 111) one after another in time. A section of the class tube line 111 corresponding to a glass tube element such as the glass tube element 51 or 51' first comes in contact with contacting device 117a, then with contacting device 117b, then with contacting device 117c, and finally with contacting device 117d. Of course, this does not exclude that more than one contacting device has contact at the same time with the outer surface.

The locally modified cooling rate of the glass tube line 111 is achieved by means of the contacting devices 117a-117d. The contacting devices 117a-117d all have, at least in the area where the glass tube line 111 is contacted, a thermal conductivity of between 1 and 100 W/(m*K). Indeed, it is preferably between 30 and 50 W/(m*K). This allows to manipulate and change the cooling rate.

Changing the cooling rate has been proven to lead to improved stress patterns, hence to improved quality of the glass tube element.

The contacting devices 117a-117d are located at spatial positions P1 . . . P4 down along the path of movement in a consecutive manner. Each of two contacting devices arranged in a consecutive manner (i.e., preferably they are direct neighbors) have a center-center-distance, preferably measured along the path of movement, of 50 cm or less. Indeed, the center-center-distance is 50 cm. Further contacting devices 119a-119d are provided at spatial positions P5 . . . P8.

Figure 4:
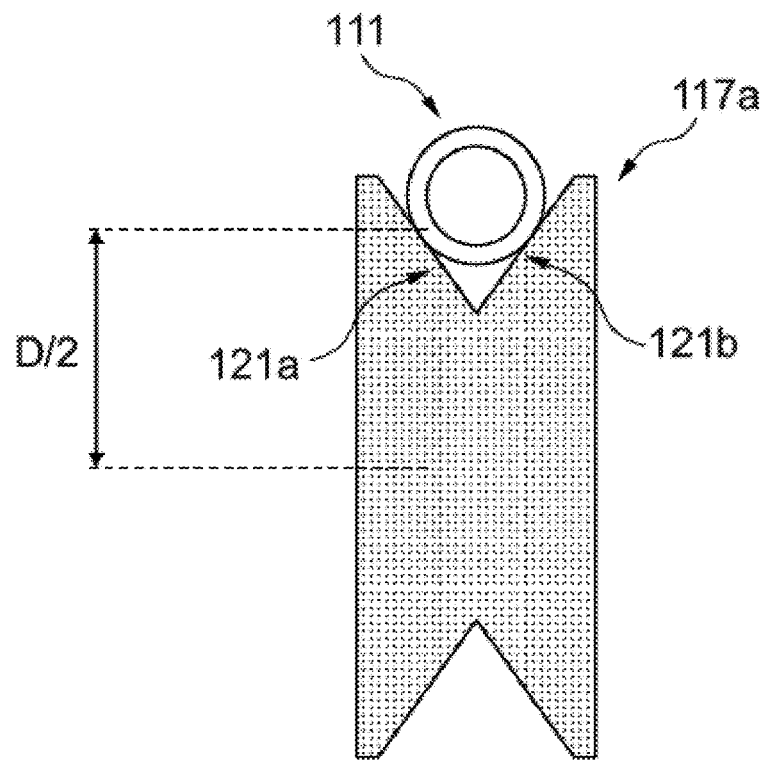
FIG. 4 shows a schematic cross-sectional view of a contacting device.

FIG. 4 shows a schematic cross-sectional view of a contacting device, such as castor, for example castor 117a. The view is obtained by a cutting plane perpendicular to the x axis in FIG. 2 such that the view comprises the center axis of the contacting device.

The castor 117a (and likewise castors 117b-117d) have a V-like recess, which allows to support and/or move the glass tube line 111 along the path of movement. This shaping allows that the contacting device, such as the castor 117a, has at the same time contact with two areas 121a, 121b of the outer surface of the class tube line 111 (hence the class tube elements) by respective contacting areas of the contacting device. The contacting areas and the areas of the outer surface 121a, 121b contacted by the contacting device 117a are separated from each other.

The areas 121a, 121b are produced by surface areas of the castors, i.e., the contacting areas, which have at least one point which in turn has a distance D/2 of 10 cm or less from the center axis of the castor 117a.

Once the glass tube line 111 (or a section thereof corresponding to a glass tube element) exits the cooling device 115, the glass tube line 111 has a surface temperature of less than Tg−50 degrees C. Of course, this is not necessary and it may still has a surface temperature of between Tg−50 and Tg+150 degrees C. However, in the preferred setup the temperature is below Tg−50 degrees C. This is true because in this case, subsequent contacts of the glass tube line 111 with other elements have no or no significant or at least no adverse effect on any preferred properties of the glass tube line 111 (hence, the glass tube elements).

Indeed, in the setup of FIG. 3, following the cooling device 115, the glass tube line 111 get in contact with the further castors 119a-119d provided at spatial positions P5 . . . P8 down along the path of movement in a consecutive manner. However, they might be different from the castors 117a-117d comprised by the cooling device 115 because they are not part of the cooling device 115 and are not used for manipulating the cooling characteristics of the glass tube line 111.

Of course, in other preferred embodiments the castors 119a-119d might correspond to contacting devises of a second cooling device.

As indicated by the circular arrow in FIG. 3, the glass tube line 111 is rotated during its period of cooling with a rotation speed of 1 round or more per second. Indeed, the glass tube line 111 is rotated the entire time until confectioning, hence, also during the period of cooling.

Downstream of some transport device 123, the glass tube line 111 is confectioned so that individual glass tube elements, such as the glass tube element 51 or 51', are obtained from that line with a desired length.

Figure 5:
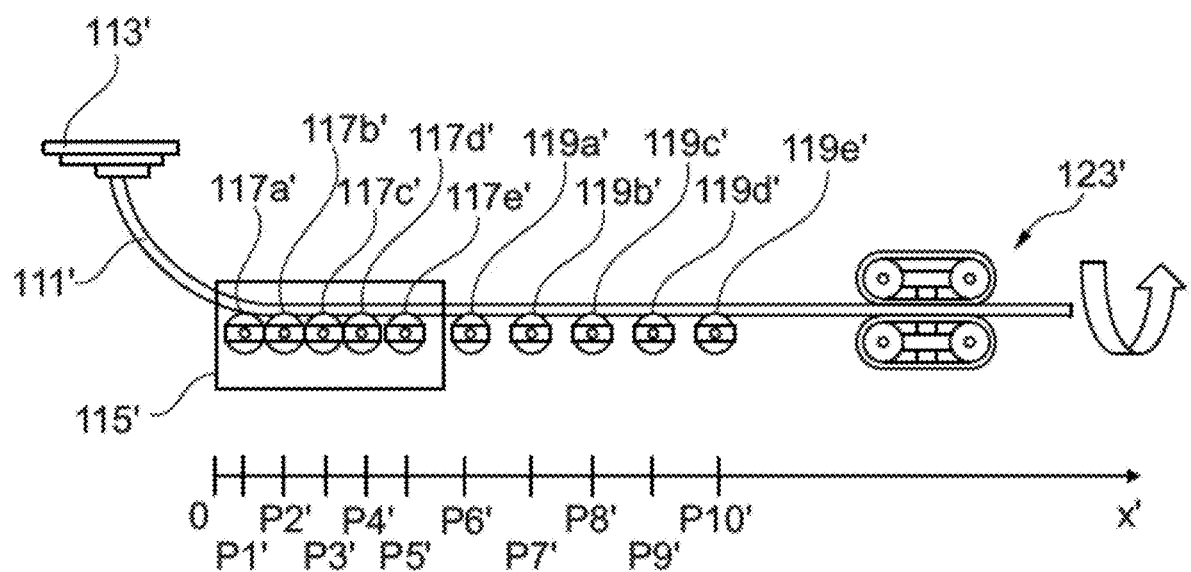
FIG. 5 shows a schematic illustration of a second exemplary production line.

FIG. 5 shows a schematic illustration of a second exemplary production line for producing a glass tube element such as the glass tube element 51 or 51'. Structural features of the second exemplary production line which are identical or similar to the structural features of the first exemplary production line are labeled in FIG. 5 with the same reference numerals, but with a single dash.

It is apparent that the second exemplary production line is largely similar to the first exemplary production line described with respect to FIG. 3. Therefore, only differences between the first and second exemplary production line need to be discussed here. In addition, reference can be made to the above explanations with respect to FIG. 3.

The production line of FIG. 5 comprises a cooling device 115' which has a plurality of five contacting devices 117a'-117e'.

The contacting devices 117a'-117e' are located at spatial positions P1' . . . P5' down along the path of movement in a consecutive manner. Each of two contacting devices arranged in a consecutive manner (i.e., preferably they are direct neighbors) have a center-center-distance, preferably measured along the path of movement, of 50 cm or less. Indeed, the center-center-distance is 30 cm.

This means, there has been added one contacting device 117e'. And the center-center-distance between adjacent contacting devices 117a'-117e' has been reduced from 50 cm to 30 cm.

This setup allows an increased interaction between the cooling device 115' and the glass tube line 111' during the period of cooling.

It has been proven to be advantageous to apply such an increased interaction, even if it comes on cost of a larger setup. The resulting glass tube elements have improved quality of the glass tube element due to the stress pattern which is of particular design.

The further castors 119a'-119e' at spatial positions P6' . . . P10' are not comprised by the cooling device 115'.

Figure 6:
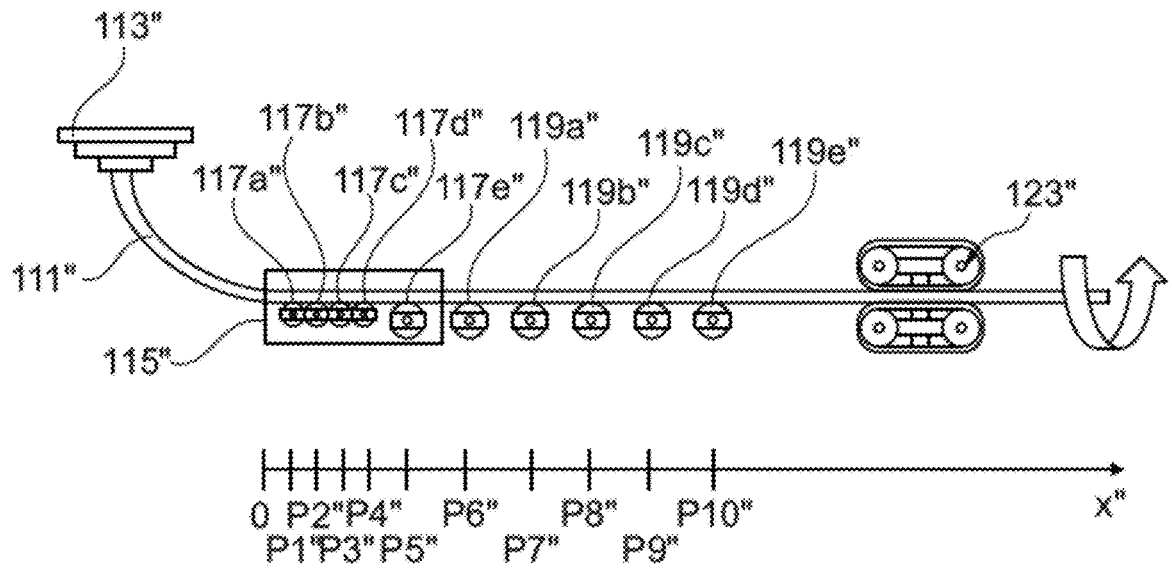
FIG. 6 shows a schematic illustration of a third exemplary production line.

FIG. 6 shows a schematic illustration of a third exemplary production line for producing a glass tube element such as the glass tube element 51 or 51'. Structural features of the third exemplary production line which are identical or similar to the structural features of the first and/or second exemplary production line are labeled in FIG. 6 with the same reference numerals, but with a double dash.

It is apparent that the third exemplary production line is largely similar to the first and second exemplary production line described with respect to FIG. 3 and FIG. 5. Therefore, only differences between the first, second and third exemplary production line need to be discussed here. In addition, reference can be made to the above explanations with respect to FIG. 3 and FIG. 5.

The production line of FIG. 6 comprises a cooling device 115" which has a plurality of five contacting devices 117a"-117e" located at spatial position P1" . . . P5" down along the path of movement in a consecutive manner.

The plurality of contacting devices 117a"-117e" can be grouped into two groups with respect to the aspects diameter and center-center-distance.

The first group comprises contacting devices 117a"-117d" at spatial positions P1" . . . P4" and the second group comprises contacting device 117e" at spatial position P5". The contacting devices 117a"-117d" of the first group have a smaller diameter than the contacting device 117e' of the second group. The smaller diameter allows that the center-center-distance of adjacent contacting devices 117a"-117d" is reduced to 3 cm.

This setup allows an increased interaction between the cooling device 115" and the glass tube line 111" during the period of cooling. It has been proven to be advantageous to have contacting devices which are closer together. Hence, by reducing the size, especially the diameter of a contacting device which is designed as a castor, more contacting devices can be applied during higher temperatures.

Since in the setup of FIG. 6 different castors are used, different interactions are obtained based inter alia on: Time of first contact and castor diameter.

Figure 7:
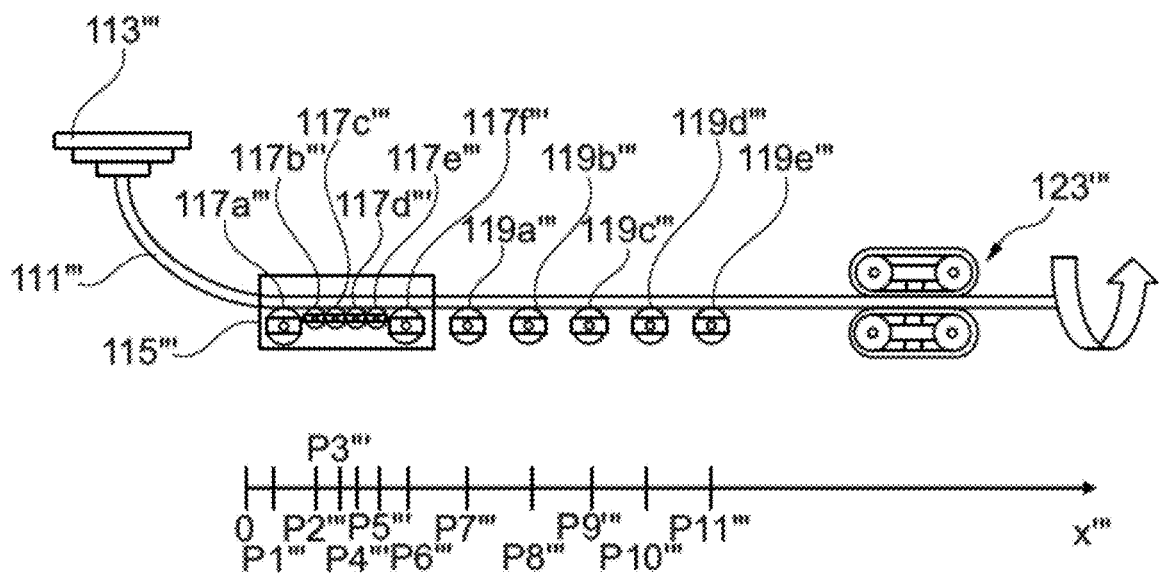
FIG. 7 shows a schematic illustration of a fourth exemplary production line.

FIG. 7 shows a schematic illustration of a fourth exemplary production line for producing a glass tube element such as the glass tube element 51 or 51'. Structural features of the fourth exemplary production line which are identical or similar to the structural features of the first, second and/or third exemplary production line are labeled in FIG. 7 with the same reference numerals, but with a triple dash.

It is apparent that the fourth exemplary production line is largely similar to the first, second and third exemplary production line described with respect to FIG. 3, FIG. 5 and FIG. 6. Therefore, only differences between the first, second, third and fourth exemplary production line need to be discussed here. In addition, reference can be made to the above explanations with respect to FIG. 3, FIG. 5 and FIG. 6.

The production line of FIG. 7 comprises a cooling device 115''' which has a plurality of six contacting devices 117a'''-117f''' located at spatial positions P1''' . . . P6''' down along the path of movement in a consecutive manner.

The plurality of contacting devices 117a'''-117f''' can be grouped into two groups with respect to the aspects diameter and center-center-distance.

The first group comprises contacting devices 117b'''-117d''' at spatial positions P2''' . . . P4''' and the second group comprises contacting devices 117a''' and 117f''' at spatial position P1''' and P5'. The contacting devices 117b'''-117d''' of the first group have a smaller diameter than the contacting devices 117a''' and 117f''' of the second group. The smaller diameter allows that the center-center-distance of adjacent contacting devices 117b'''-117d''' is reduced to 3 cm.

The arrangement of the contacting devices 117a'''-117f''' is such that the class tube line 111''' comes in contact first with the contacting device 117a''' of the second group than one after the other of contacting devices 117b'''-117d''' of the first group and finally with contacting device 117e''' of the second group.

In other words, the first interaction between the class tube line 111" and the cooling device 115''' is by means of the contacting device 117a''' which has a large diameter. Then the interaction takes place by means of the contacting devices 117b'''-117e''' which have smaller diameters. Finally interaction takes place with the contacting device 117f''' having a larger diameter.

This alternating interaction leads to a plurality of super-areas of different kind on the shell of the respective glass tube element. More specific, due to the different types of interaction, the stress values of the different super-areas lie within different value ranges.

The further castors 119a'''-119d''' at spatial positions P6' . . . P10' are not comprised by the cooling device 115'''.

Figure 8:
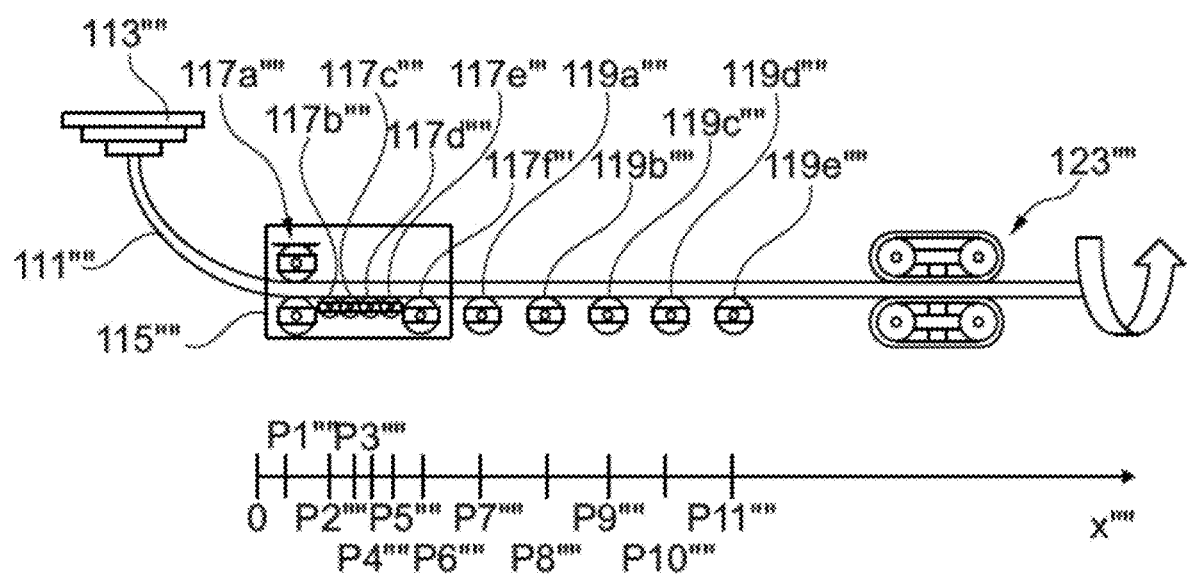
FIG. 8 shows a schematic illustration of a fifth exemplary production line.

FIG. 8 shows a schematic illustration of a fifth exemplary production line for producing a glass tube element such as the glass tube element 51 or 51'. Structural features of the fifth exemplary production line which are identical or similar to the structural features of the first, second, third and/or fourth exemplary production line are labeled in FIG. 8 with the same reference numerals, but with a fourth-times dash.

The fifth exemplary production line is based particularly on the fourth exemplary production line described with respect to FIG. 7. Therefore, only differences between the fourth and fifth exemplary production line need to be discussed here. In addition, reference can be made to the above explanations with respect to FIG. 7.

The production line of FIG. 8 comprises a cooling device 115'''' which in turn has a plurality of seven contacting devices 117a''''-117f'''' located at spatial positions P1''' . . . P6''' down along the path of movement in a consecutive manner. Indeed, with 117a'''' two contacting devices located both at P1'''' are denoted which form a contacting device group. The contacting devices 117a'''' of the contacting device group are arranged in a rotationally symmetrical manner around the glass tube line 111 (hence, around glass tube element 51 or 51').

In other words, one of the two contacting devices 117a'''' are located horizontal above and the other horizontal below the glass tube line 111''''.

This is just a further design option for increasing the number of interaction elements, especially contacting devices. This allows that at spatial position P1'''' four contacting surfaces interact between the cooling device 115'''' and the glass tube line 111'''' with only little space requirements and consumption: Two contacting devices 117a'''' each having two contacting areas (see description with respect to FIG. 4).

The features disclosed in the description, the figures as well as the claims could be essential alone or in every combination for the realization of the invention in its different embodiments.

LIST OF REFERENCE NUMERALS

1 Glass tube element
3 Shell
5 Surface
7 Surface
8 Lumen
9 Water
11a, 11b Light ray
51 Glass tube element
53 Shell
55 Lumen
57a, 57a, 57c Path
59 Surface
61a, 61b, 61c Area
61a-1' Area
61a-2' Area
61a-3' Area
63a, 63b, 63c Area
63a-1' Area
63a-2' Area
63a-3' Area
65 Area
65a', 65b', 65c', 65d', 65e', 65f' Area
67 Area
67a', 67b', 67c', 67d', 67e', 67f' Area
111, 111', 111'', 111''', 111'''' Glass tube line
113, 113', 113'', 113''', 113'''' Forming device
115, 115', 115'', 115''', 115'''' Cooling device
117a, 117a', 117a'', 117a''', 117a'''' Contact Device
117b, 117b', 117b'', 117b''', 117b'''' Contact Device
117c, 117c', 117c'', 117c''', 117c'''' Contact Device
117d, 117d', 117d'', 117d''', 117d'''' Contact Device
117e', 117e'', 117e''', 117e'''' Contact Device
117f''', 117f'''' Contact Device
119a, 119a', 119a'', 119a''', 119a'''' Contact Device
119b, 119b', 119b'', 119b''', 119b'''' Contact Device
119c, 119c', 119c'', 119c''', 119c'''' Contact Device
119d, 119d', 119d'', 119d''', 119d'''' Contact Device
119e', 119e'', 119e''', 119e'''' Contact Device
121a, 121b Area
123, 123', 123'', 123''', 123'''' Transport Device
P1, P1', P1'', P1''', P1'''' Position
P2, P2', P2'', P2''', P2'''' Position
P3, P3', P3'', P3''', P3'''' Position
P4, P4', P4'', P4''', P4'''' Position
P5, P5', P5'', P5''', P5'''' Position
P6, P6', P6'', P6''', P6'''' Position
P7, P7', P7'', P7''', P7'''' Position
P8, P8', P8'', P8''', P8'''' Position
P9', P9'', P9''', P9'''' Position
P10', P10'', P10''', P10'''' Position
P11''', P11'''' Position
D Distance
X, x', x'', x''', x'''' Axis

What is claimed is:

1. A glass tube element, comprising:
   hollow cylindrical section that has a shell enclosing a lumen; and
   a path extending on a surface of the shell facing away from the lumen, wherein the path extends across a first area of the shell where stress values are within a first interval, and wherein the path extends across a second area of the shell where stress values are within a second interval.

2. The glass tube element of claim 1, wherein the path follows at least one intersection line formed by intersecting a plane comprising an entire center axis of the glass tube element and the surface of the shell facing away from the lumen.

3. The glass tube element of claim 2, wherein the path follows the at least one of the intersection lines across an entire length of the glass tube element.

4. The glass tube element of claim 1, wherein the path follows at least one intersection line formed by intersecting a plane perpendicular to a center axis of the glass tube element and the surface of the shell facing away from the lumen.

5. The glass tube element of claim 4, wherein the path follows the at least one of the intersection lines across the entire outer circumference of the glass tube element.

6. The glass tube element of claim 1, the second area follows successively after the first area along the path.

7. The glass tube element of claim 1, wherein the path extends across a first plurality of first areas and a second plurality of second areas.

8. The glass tube element of claim 7, wherein the first and second areas occur repeatedly alternately along the path.

9. The glass tube element of claim 7, wherein the first and second areas occur in direct succession along the path.

10. The glass tube element of claim 1, wherein the path extends across a third area of the shell where stress values are within a third interval, wherein, along the path, the third area has a position selected from a group consisting of: follows successively after the first area, arranged directly between the first area and a next first area, and arranged directly between the first area and the second area.

11. The glass tube element of claim 1, wherein the path extends across a number of successive sub-areas of the second area where stress values of each sub-area are within a respective sub-interval comprised by the second interval.

12. The glass tube element of claim 1, wherein the first and second areas are arranged along the path such that the second area is diametrically opposed to the first area.

13. The glass tube element of claim 1, wherein the stress values of the first interval are different to and/or non-overlapping with the stress values of the second interval.

14. The glass tube element of claim 1, wherein the stress values of the first interval correspond to compressive stress and an upper border of the second interval has an absolute value larger than a greatest absolute value of the first interval.

15. The glass tube element of claim 1, wherein the stress values of the first interval comprise a value range between −0.5 MPa and −10 MPa.

16. The glass tube element of claim 1, wherein the stress values of the first interval comprise a value range between −4 MPa and −6 MPa.

17. The glass tube element of claim 1, wherein the stress values of the second interval correspond to an offset relative to the first interval of up to −5 MPa.

18. The glass tube element of claim 1, wherein the stress values of the second interval correspond to an offset relative to the first interval of between −1 MPa and −2.5 MPa.

19. The glass tube element of claim 1, wherein the first and second areas each comprise (i) at least one surface area of the surface of the shell facing away from the lumen and/or (ii) at least one volume area of the shell, wherein the shell preferably has a thickness measured from the surface of the shell facing away from the lumen in perpendicular direction towards the lumen.

20. The glass tube element of claim 1, wherein the first area comprises first groups connected with each other by a connected first super-area of the shell,
    wherein the second area comprises second groups connected with each other by a connected second super-area of the shell,
    wherein the first and second super-areas are connected with each other by a connected super-sub-area of the shell.

21. The glass tube element of claim 20, wherein the stress values in the first super-area lie within the first interval, and wherein the stress values in the second super-area lie within the second interval.

22. The glass tube element of claim 21, wherein on the unrolled cylinder shell the first super-area and/or the second super-area each is designed at least in part in form of at least one stripe or in form of a plurality of parallel and/or non-parallel stripes.

* * * * *